(12) United States Patent
Kachare et al.

(10) Patent No.: US 11,231,764 B2
(45) Date of Patent: Jan. 25, 2022

(54) SYSTEM AND METHOD FOR SUPPORTING CHASSIS LEVEL KEEP ALIVE IN NVME-OF BASED SYSTEM

(71) Applicant: Samsung Electronics Co., Ltd., Suwon-si (KR)

(72) Inventors: Ramdas P. Kachare, Pleasanton, CA (US); Sompong Paul Olarig, Pleasanton, CA (US); Wentao Wu, Milpitas, CA (US); Jason Martineau, Milpitas, CA (US); Oscar P. Pinto, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 221 days.

(21) Appl. No.: 16/223,097

(22) Filed: Dec. 17, 2018

(65) Prior Publication Data

US 2020/0125157 A1    Apr. 23, 2020

Related U.S. Application Data

(60) Provisional application No. 62/747,116, filed on Oct. 17, 2018.

(51) Int. Cl.
| | |
|---|---|
| *G06F 1/32* | (2019.01) |
| *G06F 13/16* | (2006.01) |
| *G06F 1/3209* | (2019.01) |
| *G06F 3/06* | (2006.01) |
| *G06F 13/40* | (2006.01) |

(52) U.S. Cl.
CPC .......... *G06F 1/3209* (2013.01); *G06F 3/0604* (2013.01); *G06F 3/0659* (2013.01); *G06F 3/0679* (2013.01); *G06F 13/1668* (2013.01); *G06F 13/4009* (2013.01)

(58) Field of Classification Search
None
See application file for complete search history.

(56) References Cited

U.S. PATENT DOCUMENTS

| | | | |
|---|---|---|---|
| 7,779,282 B2 | 8/2010 | Ramachandran et al. | |
| 8,307,234 B2 | 11/2012 | Gobriel et al. | |
| 8,793,523 B2 | 7/2014 | Park | |
| 10,021,203 B2 | 7/2018 | Papakipos et al. | |
| 10,459,665 B2 * | 10/2019 | Olarig | H04L 41/0806 |
| 11,076,015 B2 * | 7/2021 | Isberg | H04L 67/12 |
| 2008/0162682 A1 * | 7/2008 | Ramachandran | G06F 1/3203 709/223 |
| 2014/0098727 A1 * | 4/2014 | Murabito | H04W 52/0235 370/311 |
| 2015/0026491 A1 * | 1/2015 | Park | H04L 12/12 713/310 |
| 2015/0177812 A1 * | 6/2015 | Boss | G06F 1/3296 713/320 |
| 2017/0310538 A1 * | 10/2017 | Cai | H04Q 11/00 |

* cited by examiner

*Primary Examiner* — Fahmida Rahman
(74) *Attorney, Agent, or Firm* — Renaissance IP Law Group LLP

(57) ABSTRACT

A chassis is disclosed. The chassis may include a processor, a switch, and at least one storage device in communication with a remote processor. The storage device may support an active power mode and a low power mode. A response to a Keep Alive (KA) message may be sent to the remote processor on behalf of the storage device when the storage device is in low power mode.

8 Claims, 14 Drawing Sheets

SYSTEM AND METHOD FOR SUPPORTING CHASSIS LEVEL KEEP ALIVE IN NVME-OF BASED SYSTEM

RELATED APPLICATION DATA

This application claims the benefit of U.S. Provisional Patent Application Ser. No. 62/747,116, filed Oct. 17, 2018, which is incorporated by reference herein for all purposes.

FIELD

The inventive concepts relate generally to computer systems, and more particularly to remote storage devices.

BACKGROUND

A Keep Alive (KA) signal is often sent at predefined intervals, and plays an important role on the Internet. After a signal is sent, if no reply is received the link is assumed to be down and future data may be routed via another path until the link is up again. A Keep Alive signal may also be used to indicate to Internet infrastructure that the connection should be preserved. Without a Keep Alive signal, intermediate Network Address Translation (NAT)-enabled routers may drop the connection after timeout.

Since the only purpose of the Keep Alive signal is to find links that do not work or to indicate connections that should be preserved, Keep Alive messages tend to be short and typically do not take much bandwidth. But their precise format and usage terms depend on the communication protocol.

Periodic keep-alive is a mandatory feature in Non-Volatile Memory Express (NVMe) over Fabrics (NVMe-oF), and optional in NVMe 1.2.1 for Peripheral Component Interconnect Express (PCIe). In order to avoid a race condition where the host sends a Keep Alive signal competing with the target side Keep Alive timeout expiration, the host may add a grace period of 10 seconds when publishing the Keep Alive timeout to the target. In case a Keep Alive failed (or timed out) event occurs, a transport specific error recovery may kick in.

NVMe-oF Specification section 7.3.5 (Keep Alive Settings) states that:

Keep Alive functionality is not supported by all RDMA provider types at the RDMA Transport layer. As a result, the RDMA Transport requires the use of the Keep Alive Feature (refer to section 5.15.1.14 in the NVMe Base specification). It is recommended that any RDMA provider level functionality be disabled to avoid redundant and conflicting policies.

The RDMA Transport does not impose any limitations on the minimum and maximum Keep Alive Timeout value. The minimum should be set large enough to account for any transient fabric interconnect failures between the host and controller.

NVMe-oF Specification 5 (Discovery Service) states that "[t]he Keep Alive command is reserved for Discovery controllers. A transport may specify a fixed Discovery controller activity timeout value (e.g., 2 minutes). If no commands are received by a Discovery controller within that time period, the controller may perform the actions for Keep Alive Timer expiration defined in section 7.1.2".

In order to comply to NVMe-oF Keep Alive requirement, NVMe-oF devices may not simply "go to sleep" or enter a low power mode, because the NVMe controller is required to periodically to send keep alive signals back to the host. But low power modes are essential for modern datacenter cost control.

A need remains for a way to support handling Keep Alive signals for NVMe-oF devices while still permitting the NVMe-oF devices to enter a low power mode.

DETAILED DESCRIPTION

Figure 1:
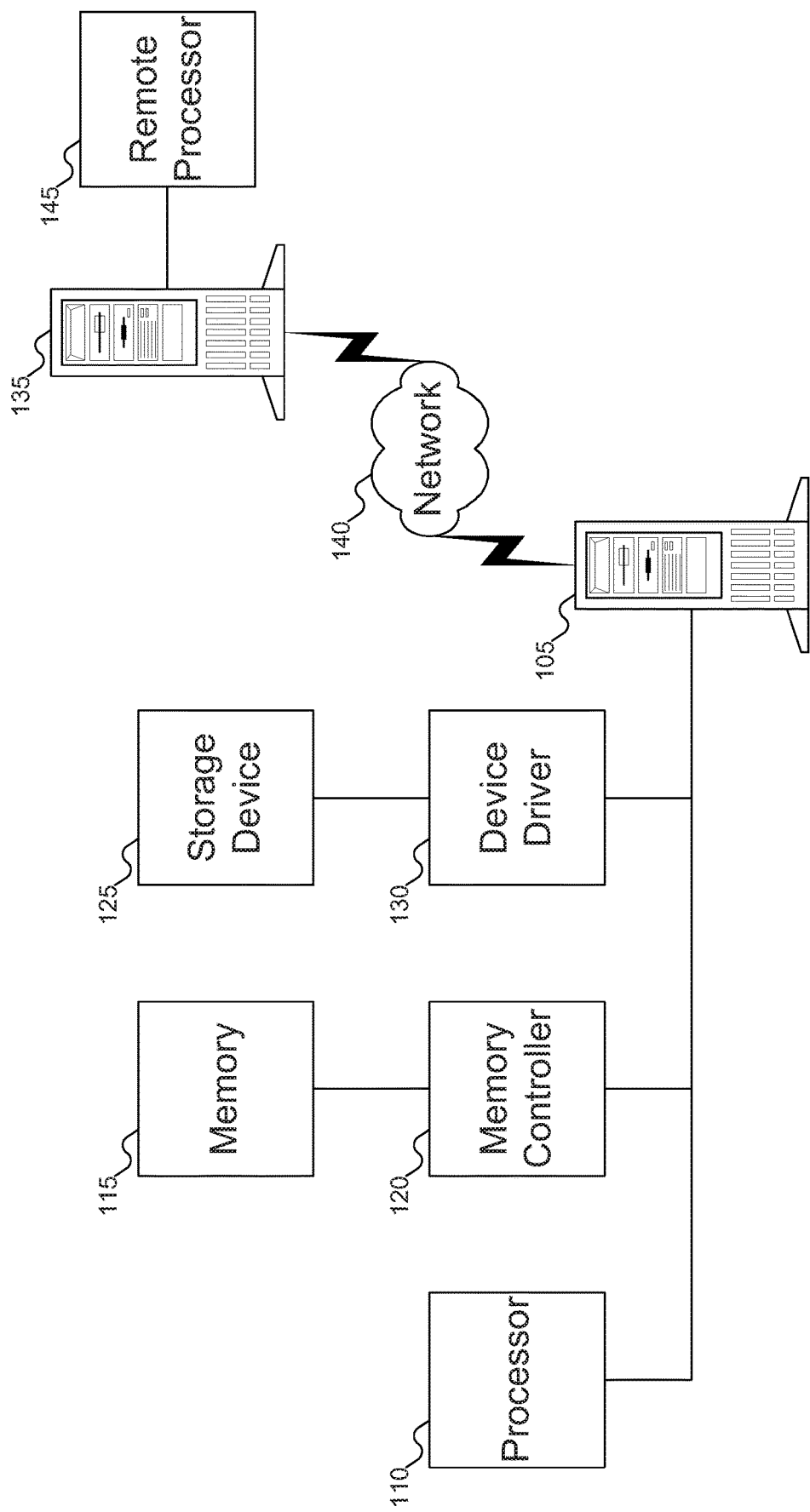
FIG. 1 shows a machine designed to respond to a Keep Alive (KA) message from a remote processor on behalf of a storage device in a low power state, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

From a chassis level perspective, the Baseboard Management Controller (BMC) is ideal to manage keep alive traffic for all Non-Volatile Memory Express (NVMe) over Fabrics (NVMe-oF) devices, since the BMC has accessed to all storage devices in the system, a network connection directly to the hosts via the embedded Ethernet switch, and a connection to the system administrator via the management Local Area Network (LAN). During device low power or idle activities, the BMC may be used as a proxy for managing the Keep Alive (KA) traffic for any or all NVMe-oF storage devices present in the system.

System Level Keep Alive Proposal:

The Keep Alive feature is designed to detect if a remote side is alive and serviceable. In order to reduce power consumption on the system level, a system level Keep Alive mechanism in some storage configuration is described, which may be used, for example, with Redundant Array of Independent Disks (RAID) levels 1 or 1+0, which use mirroring. Half of the devices (for example, the devices with odd number device identifiers (IDs)) may work as primary devices, and the other half of the devices (for example, the devices with even number devices IDs) may work as secondary devices.

When a Read Only workload is detected, the BMC may set all secondary storage devices into sleep mode, and program the routing table in the switch to route command frames to the BMC (specifically Keep Alive commands). The BMC may help secondary storage devices by responding to Keep Alive Commands on their behalf, rather than wake the secondary storage devices up. This configuration conserves power.

When a Write command is detected, the BMC may wake up secondary device and forward the Write Command to the secondary device, according to normal mirroring operations.

System Level Keep Alive Using Cache:

The BMC may also incorporate a cache to rapidly respond to requests directed to SSDs that have been put in low power mode by the BMC. By incorporating a cache into the BMC, embodiments of the inventive concept may extend to situations without device mirroring (where one device is always in a fully ready state), by avoiding the time needed to wake a device when the requested data is in the cache. The cache in the BMC may also be used for other purposes.

Embodiments of the inventive concept may support reprogramming the chassis switch ports to redirect host/initiator Inputs/Outputs (I/Os) from devices in low power mode to the BMC.

Embodiments of the inventive concept may support certain inquiry requests—for example, SMARTLog requests—being sent from the host to the device over an out-of-band path (such as the System Management Bus (SMBus)), since devices in low power mode may still be able to satisfy these types of non-IO requests.

FIG. 1 shows a machine designed to respond to a Keep Alive (KA) message from a remote processor on behalf of a storage device in a low power state, according to an embodiment of the inventive concept. In FIG. 1, machine 105 is shown. Machine 105 may include processor 110. Processor 110 may be any variety of processor: for example, an Intel Xeon, Celeron, Itanium, or Atom processor, an AMD Opteron processor, an ARM processor, etc. While FIG. 1 shows a single processor 110 in machine 105, machine 105 may include any number of processors, each of which may be single core or multi-core processors, and may be mixed in any desired combination.

Machine 105 may also include memory 115, which may be managed by a memory controller (not shown). Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be managed by memory controller 120.

Machine 105 may also include storage device 125, which may be controlled by device driver 130. Storage device 125 may be any desires form of storage device. For example, storage device 125 may be a Non-Volatile Memory Express (NVMe) Solid State Drive (SSD).

Although FIG. 1 depicts machine 105 as a server (which could be either a standalone or a rack server), embodiments of the inventive concept may include machine 105 of any desired type without limitation. For example, machine 105 could be replaced with a desktop or a laptop computer or any other machine that may benefit from embodiments of the inventive concept. Machine 105 may also include specialized portable computing machines, tablet computers, smartphones, and other computing machines.

Machine 105 may be in communication with remote machine 135 via network 140. Network 140 may be any variety of network, including a Local Area Network (LAN), a Wide Area Network (WAN), a Metropolitan Area Network (MAN), or a global network, such as the Internet. Network 140 may also any combination of such networks. In addition, network 140 may include wired connections, wireless connections, or both, between machine 105 and remote machine 135.

Remote machine 135 may include remote processor 145, running applications that access data from storage device 125 of machine 105. For example, storage device 125 may be a Remote Direct Attached Storage (RDAS), accessible from remote processor 145. Because remote processor 145 may want to ensure that storage device 125 is still operating and available, remote processor 145 may send occasional Keep Alive (KA) messages to storage device 125. If storage device 125 sends a response to the KA message to remote processor 145, then remote processor 145 knows that storage device 125 is still operating and available; if storage device 125 does not respond, then remote processor 145 knows that storage device 125 is not available. Remote processor 145 may communicate with storage device 125 using any appropriate elements: for example, using a Network Interface Card (NIC) or through an Ethernet connection somewhere else within machine 105, such as on a switch.

The disadvantage of the conventional structure is that storage device 125 needs to be able to send a response to the KA message to remote processor 145. For storage device 125 to send such a response, storage device 125 needs to be active. But if storage device 125 is active, then it cannot be in a low power mode, which means that storage device 125 is using a lot of power. If storage device 125 could be in a low power mode (for example, if storage device 125 does not have to respond to any data requests), then storage device 125 could achieve potentially significant power savings over being in an active power mode. By offloading the handling of KA messages to another component (one that is always active, and potentially uses less power when active than storage device 125), storage device 125 could enter a low power mode without having to handle KA messages (which normally require storage device 125 to be in an active power mode).

Figure 2:
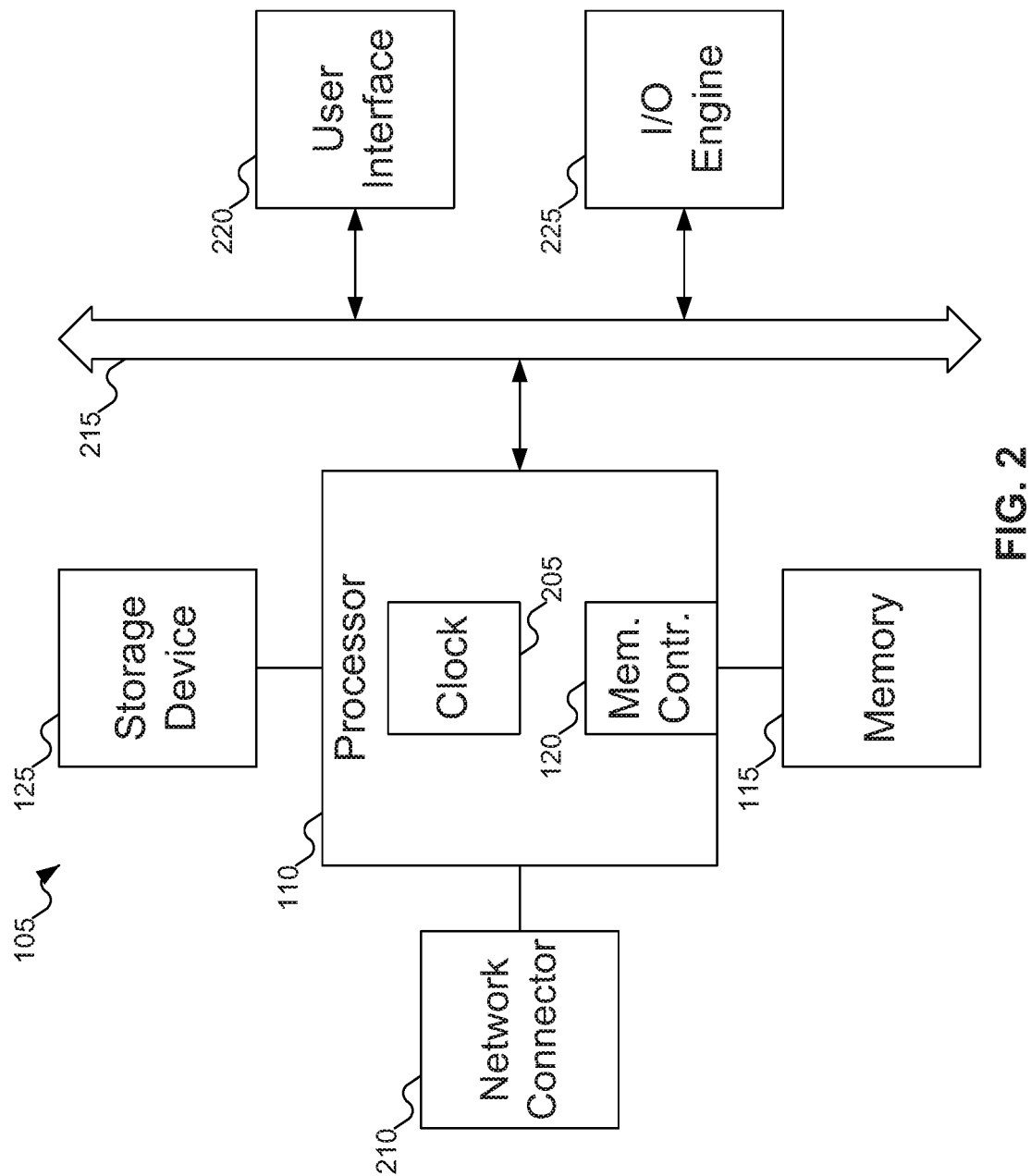
FIG. 2 shows additional details of the machine of FIG. 1.

FIG. 2 shows additional details of the machine of FIG. 1. In FIG. 2, typically, machine 105 includes one or more processors 110, which may include memory controllers 115 and clocks 205, which may be used to coordinate the operations of the components of device 105. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
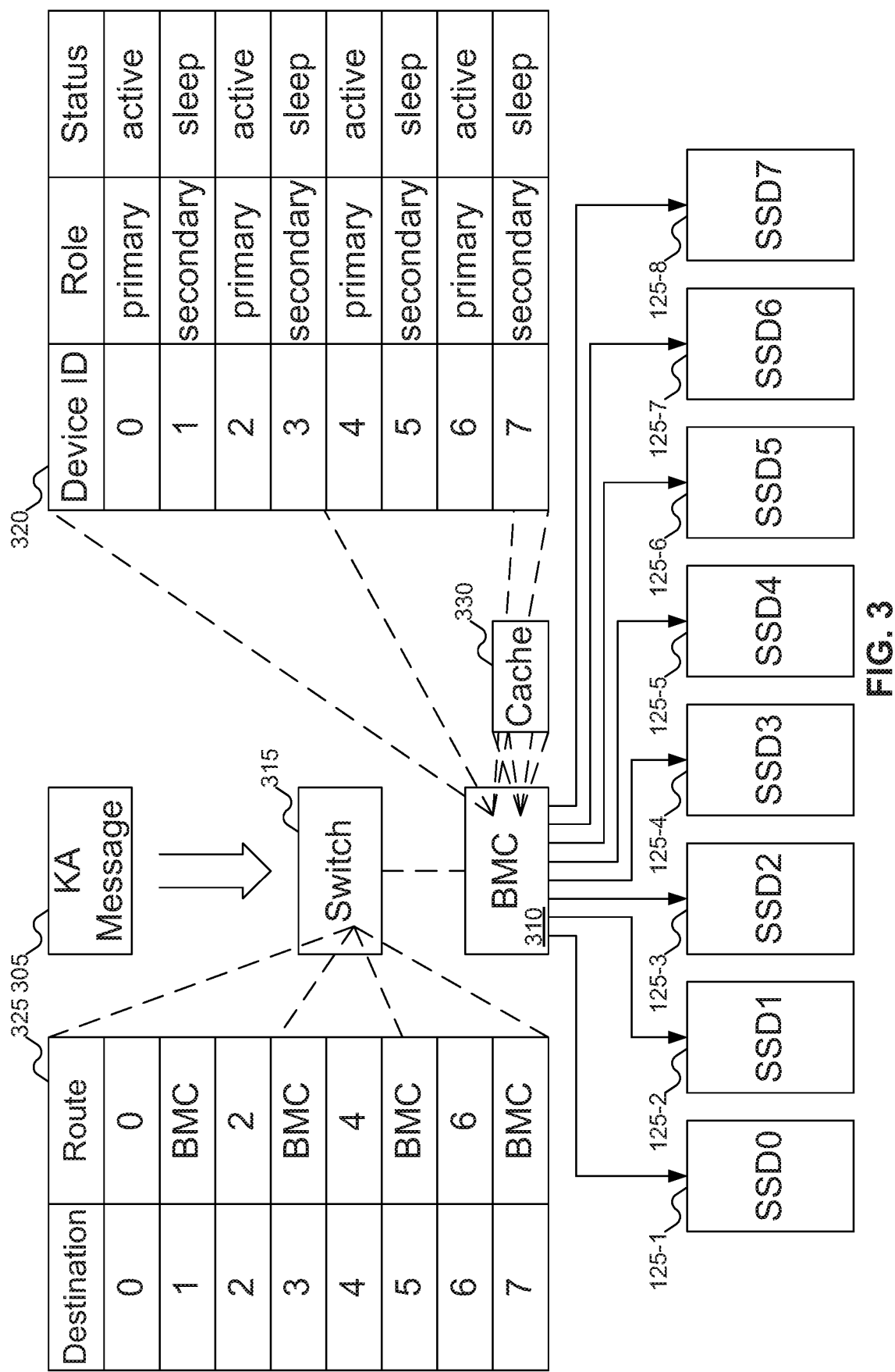
FIG. 3 shows a Baseboard Management Controller (BMC) that may respond to KA messages on behalf of storage devices.

FIG. 3 shows a Baseboard Management Controller (BMC) that may respond to KA messages 305 on behalf of storage devices. In FIG. 3, BMC 310 is shown connected to storage devices 125-1 through 125-8. Since BMC 310 conventionally connects to most (if not all) components in machine 105 of FIG. 1 (for example, to support checking the temperatures of the various components in order to adjust cooling within machine 105), BMC 310 is a useful choice for handling KA messages 305 on behalf of storage devices 125-1 through 125-8. But note that any other component that is capable of processing KA messages 305 on behalf of storage devices 125-1 through 125-8 may be used instead of BMC 310: for example, processor 110 of FIG. 1 or switch 315. All that is required is that the component intended to process KA messages 305 on behalf of storage devices 125-1 through 125-8 be able to inspect the contents of the packets intended for storage devices 125-1 through 125-8. Any subsequent discussion that focuses on BMC 310 may be understood to be equally applicable to any other appropriate component.

To support handling KA messages 305 on behalf of storage devices 125-1 through 125-8, BMC 310 may communicate with switch 315. BMC 310 may inform switch 315 that communications intended for storage devices 125-1 through 125-8 may be directed instead to BMC 310. Note that this is not an "all or nothing" arrangement: BMC 310 may reprogram switch 315 to redirect communications for individual storage devices 125-1 through 125-8. For example, FIG. 3 shows BMC 315 as including device status table 320, which indicates the status of the various storage devices. Device status table 320 shows that primary storage devices 125-1, 125-3, 125-5, and 125-7 are all active, whereas secondary storage devices 125-2, 125-4, 125-6, and 125-8, which are mirrors of storage devices 125-1, 125-3, 125-5, and 125-7, are all asleep. Thus, BMC 310 may reprogram routing table 325 of switch 315 to redirect communications intended for storage devices 125-2, 125-4, 125-6, and 125-8 to BMC 310, but leave communications intended for storage devices 125-1, 125-3, 125-5, and 125-7 to continue to their intended destinations. In addition, components other than BMC 310 may be responsible for reprogramming routing table 325 of switch 315. For example, if switch 315 is responsible for determining the workloads of storage devices 125-1 through 125-8 and determining that storage devices 125-1 through 125-8 should enter low power mode, switch 315 may reprogram routing table 325 to redirect traffic intended for storage devices 125-1 through 125-8 to BMC 310 itself.

Upon receiving KA message 305, BMC 310 may generate a pre-programmed response, which may be sent back to remote processor 145 of FIG. 1. In this manner, remote processor 145 of FIG. 1 may generate KA messages 305 as appropriate and receive responses to KA messages 305, but storage devices 125-2, 125-4, 125-6, and 125-8 may enter the sleep status (a low power mode), reducing the overall power used by machine 105 of FIG. 1.

While device status table 320 shows some storage devices in an active power mode and others in a low power mode, embodiments of the inventive concept may have any storage device be in any desired power mode at any time. For example, if storage devices 125-1 through 125-8 are all idle, storage devices 125-1 through 125-8 could all be in low power modes, with BMC 310 handling KA messages 305 on behalf of all of storage devices 125-1 through 125-8.

At this point, it is useful to understand why and how storage devices 125-1 through 125-8 may enter a low power mode: there are various possibilities. In one embodiment of the inventive concept, storage devices 125-1 through 125-8 may each monitor their own workloads, and may (individually) inform BMC 310 when any storage device's workload (activity level) has dropped to the point that entering low power mode is advisable. In another embodiment of the inventive concept, storage devices 125-1 through 125-8 may each monitor their own workloads: when a primary storage device detects a Read Only workload (in which data is being read from the storage device but not written to the storage device), the primary storage device may advise BMC 310 to put a corresponding secondary storage device (i.e., a mirror of the primary storage device) in low power mode (as no data needs to be written to the secondary storage device). In another embodiment of the inventive concept, storage devices 125-1 through 125-8 may realize that they are about to be idle—for example, if the current user whose data was stored on storage devices 125-1 through 125-8 has ended his or her lease of storage devices 125-1 through 125-8, and no new user is currently scheduled to lease storage devices 125-1 through 125-8. In another embodiment of the inventive concept, switch 315 (which may track all traffic to each of storage devices 125-1 through 125-8) may inform BMC 310 that the workloads of one or more of storage devices 125-1 through 125-8 has dropped to the point that the storage device in question may benefit from entering a low power mode.

Regardless of how the decision is made, BMC 310 may instruct the storage device in question to enter the low power mode. The storage device may then respond to BMC 310 when low power mode has been entered. Alternatively, the storage device might simply enter low power mode, then notify BMC 310 of this fact. This communication from the storage device may include protocol state information, as the protocol state of the storage device may be included in the response to KA message 305. BMC 310 may then store this protocol state information in device status table 320. BMC 310 may then instruct a Power Distribution Board (PDB) (not shown in FIG. 3) to reduce power incrementally to the storage device in question. The PDB may be responsible for delivering power to the various components in machine 105 of FIG. 1: if not instructed otherwise, the PDB may provide more power than a component would use, particularly if the component is in a low power mode.

As shown in FIG. 3, BMC 310 may include cache 330. Cache 330 may act as a local storage for BMC 310 to store data that may be requested again in the near term. Note that while FIG. 3 shows cache 330 as part of BMC 310, embodiments of the inventive concept may include cache 330 located elsewhere: for example, cache 330 may be part of memory 115 of FIG. 1. The term "cache" should therefore be understood as encompassing other forms of storage that are faster than accessing the storage device storing the desired data. Note further that cache 330 does not necessarily have to be faster than the storage device in all situations, but only that cache 330 is faster than accessing the desired data in some situations. For example, cache 330 might include storage that is slower than accessing data from an SSD that is in an active power mode, but faster than accessing data from an SSD that is in a low power mode, as there is a delay inherent in returning the SSD to an active power mode.

Any desired algorithm may be used to determine when data should be added to and/or removed from cache 330: for example, a Least Recently Used (LRU) or a Least Frequently Used (LFU) algorithm. Cache 330 may be used to store data relating to data requests sent from remote processor 145 of FIG. 1 to a storage device in low power mode. For example, cache 330 may be used to access data that was requested by remote processor 145 of FIG. 1 in a read request, but the storage device in question is currently in low power mode. Or, cache 330 may be used to store data sent by remote processor 145 of FIG. 1 in a write request, but (again) the storage device in question is currently in low power mode. Cache 330 is discussed further with reference to FIG. 6 below.

In the above discussion, BMC 310 is described as handling KA messages 305 on behalf of storage devices 125-1 through 125-8 that are in low power mode. If storage devices 125-1 through 125-8 are in an active power mode and include the appropriate logic to respond to KA messages 305, storage devices 125-1 through 125-8 may respond to KA messages 305 themselves. But in some embodiments of the inventive concept, storage devices 125-1 through 125-8 may not include the necessary logic to respond to KA messages 305: that is, storage devices 125-1 through 125-8 may not be able to generate and send the appropriate response to KA messages 305. In such embodiments of the inventive concept, switch 315 may send most traffic to storage devices 125-1 through 125-8, but send KA messages 305 to BMC 310. In this manner, BMC 310 may send responses to KA messages 305 even when storage devices 125-1 through 125-8 are in an active power mode, if storage devices 125-1 through 125-8 are not capable of responding to KA messages 305. (Obviously, if some of storage devices 125-1 through 125-8 may respond to KA messages 305 and others may omit the appropriate circuitry, BMC 310 may respond to KA messages 305 only on behalf of those storage devices that lack the necessary circuitry, with the storage devices including the necessary circuitry responding to KA messages 305 themselves when in an active power mode.)

As discussed below with reference to FIG. 9, in some embodiments of the inventive concept some storage devices may be capable of responding to KA message 305 even when operating in low power mode. Thus, the phrase "on behalf of" should be understood to mean that some component responds to KA message 305 when KA message 305 is sent to storage devices 125-1 through 125-8 when they are in low power mode. "On behalf" of may also encompass storage devices 125-1 through 125-8 responding to KA message 305 themselves even when storage devices 125-1 through 125-8 are in low power mode. "On behalf" of should not be read narrowly to mean only that some component other than storage devices 125-1 through 125-8 (for example, BMC 310) necessarily must respond to KA message 305 when storage devices 125-1 through 125-8 are in low power mode. On the other hand, "on behalf" of is not intended to encompass storage devices 125-1 through 125-8 responding to KA message 305 when storage devices 125-1 through 125-8 are in active power mode, as there is no power savings when storage devices 125-1 through 125-8 are in active power mode.

Figure 4:
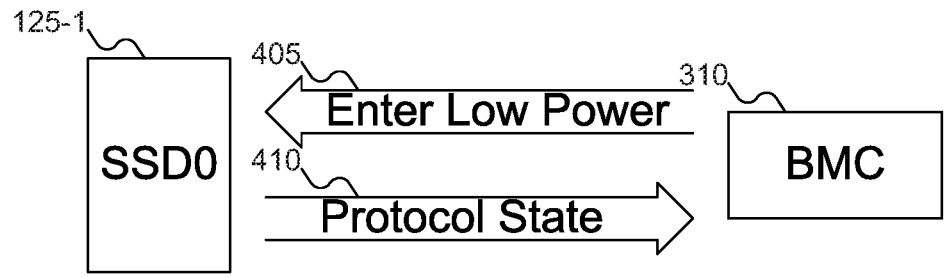
FIG. 4 shows the BMC of FIG. 3 instructing the storage device of FIG. 1 to enter a low power mode.

FIG. 4 shows BMC 310 of FIG. 3 instructing storage device 125-1 of FIG. 3 to enter a low power mode. In FIG. 4, BMC 310 may send instruction 405 for storage device 125-1 to enter low power mode. Once storage device 125-1 has done whatever preparation is necessary to enter low power mode, storage device 125-1 may send a response to BMC 310: this response may include protocol state 410 of storage device 125-1. Note that in some embodiments of the inventive concept, as part of entering low power mode storage device 125-1 may reprogram switch 315 of FIG. 1 to redirect traffic addressed to storage device 125-1 to BMC 310 instead.

Figure 5:
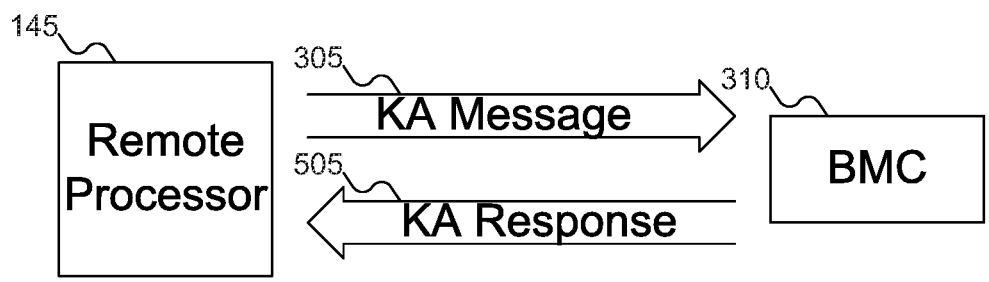
FIG. 5 shows the BMC of FIG. 3 responding to a KA message from the remote processor of FIG. 1 on behalf of the storage device of FIG. 1.

FIG. 5 shows BMC 310 of FIG. 3 responding to KA message 305 of FIG. 3 from remote processor 145 of FIG. 1 on behalf of the storage device of FIG. 1. In FIG. 5, remote processor 145 may send KA message 305, intended for any of storage devices 125-1 through 125-8 of FIG. 3. Switch 315 of FIG. 3 may redirect KA message 305, based on routing table 325 of FIG. 3, to BMC 310. BMC 310 may then send KA response 505 to remote processor 145. KA response 505 may be a preprogrammed response, or it may include additional information, such as protocol state 410 of FIG. 4.

Figure 6:
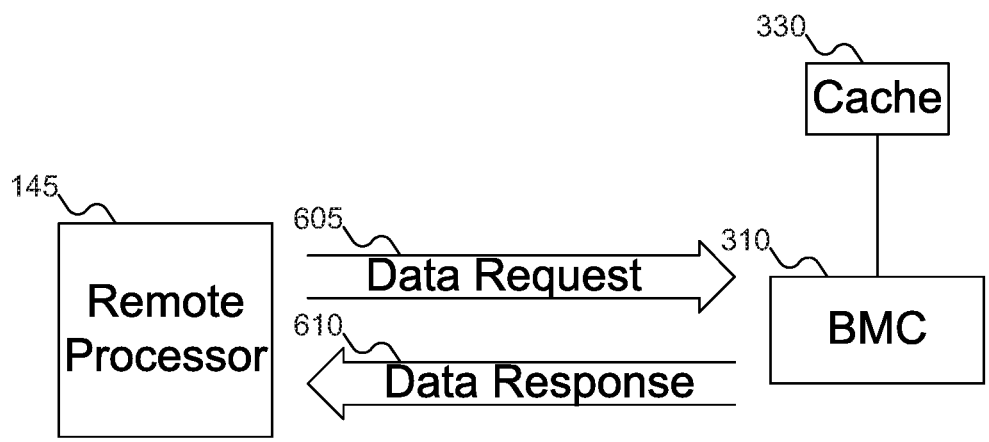
FIG. 6 shows the BMC of FIG. 3 responding to a data request from the remote processor of FIG. 1 using a cache.

FIG. 6 shows BMC 310 of FIG. 3 responding to a data request from remote processor 145 of FIG. 1 using a cache. In FIG. 6, remote processor 145 may send data request 605 intended for any of storage devices 125-1 through 125-8 of FIG. 3. Switch 315 of FIG. 3 may redirect data request 605, based on routing table 325 of FIG. 3, to BMC 310.

If data request 605 is a read request, BMC 310 may check to see if the data in question is available in cache 330. If the data in question is available in cache 330, BMC 310 may read the data from cache 330 and send the data back to remote processor 145 in data response 610, thus allowing the storage device ordinarily holding that data to remain in a low power mode. If the data in question is not present in cache 330, then BMC 310 may forward data request 605 to the appropriate storage device, returning the storage device to an active power mode so that the storage device may respond to data request 605.

If data request 605 is a write request, BMC 310 may store the data in cache 330 and send data response 610 back to remote processor 145, letting remote processor 145 know that the write request has been "completed". At some later time, when the appropriate storage device is in active power mode, BMC 310 may read the data back out of cache 330 and send the data to the appropriate storage device (using an approach typically called a "write-back cache"). Using a "write-back cache" may allow the write to be "completed" (as seen from remote processor 145) faster as data response 610 may be sent without taking the time needed to wake up the storage device from low power mode. BMC 310 may also wake the storage device up to complete the write request, either before or after BMC 310 sends data response 610 to remote processor 145. Of course, using a write-back cache would imply that cache 330 is protected against an unexpected power interruption (to avoid data loss before the data is written to the storage device): cache 330 may be implemented using Non-Volatile (NV) storage, or may be protected against a power failure by a battery backup. Alternatively, BMC 310 may store the data in cache 330, wake up the storage device, then write the data to the (now awake) storage device before responding to remote processor 145 that the write request is complete (using an approach typically called a "write-through cache").

Figure 7:
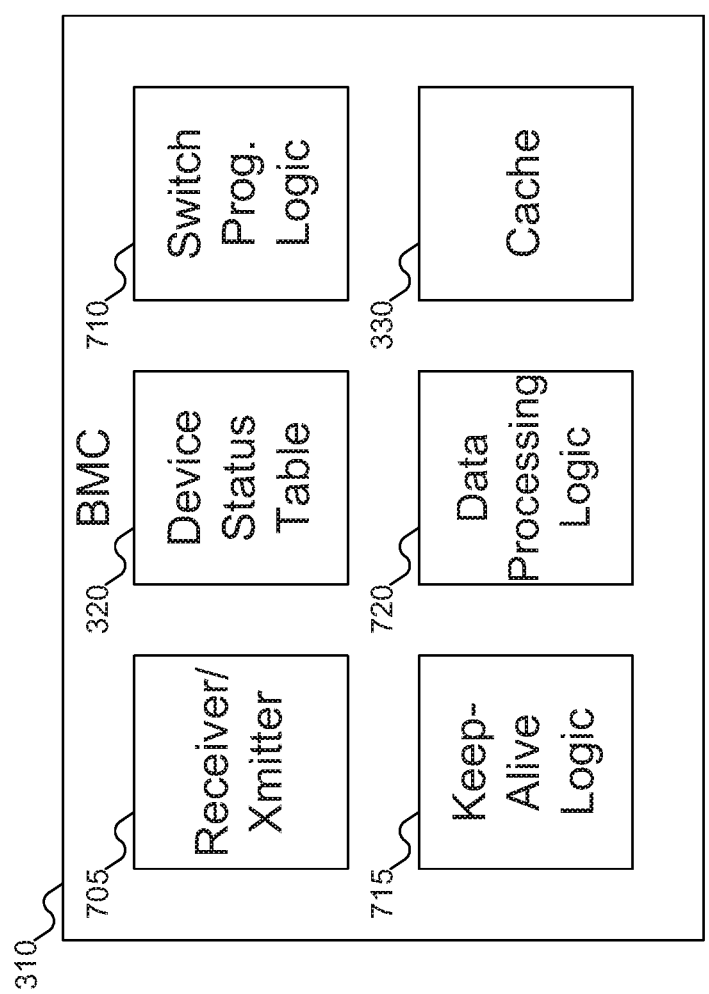
FIG. 7 shows details of the BMC of FIG. 3.

FIG. 7 shows details of BMC 310 of FIG. 3. In FIG. 7, BMC 310 is shown as including receiver/transmitter 705, device status table 320, switch programming logic 710, Keep-Alive Logic 715, data processing logic 720, and cache 330. Receiver/transmitter 705 may be used to send and receive data to other components of machine 105 of FIG. 1 and to other machines and machine components, such as remote processor 145 of FIG. 1. For example, receiver/transmitter 705 may receive communications from storage devices 125-1 through 125-8 of FIG. 3 indicating that the storage devices may or are entering low power mode or active power mode, or KA message 305 from remote processor 145 of FIG. 1; and receiver/transmitter 705 may send communications to storage devices 125-1 through 125-8 of FIG. 9 instructing them to enter low power mode or active power mode, instructions to switch 315 of FIG. 3 to change where communications intended for storage devices 125-1 through 125-8 of FIG. 9 should be delivered (for example, that KA message 305 of FIG. 3 should be sent to BMC 310 instead of storage devices 125-1 through 125-8 of FIG. 3), or KA response 505 of FIG. 5 to remote processor 145 of FIG. 1. In embodiments of the inventive concept where BMC 310 also includes cache 330 of FIG. 3, receiver/transmitter 705 may also receive data request 605 of FIG. 6 sent from remote processor 145 of FIG. 1 to storage devices 125-1 through 125-8 of FIG. 3, and may send data response 610 of FIG. 6 to remote processor 145 of FIG. 1 if data request 605 of FIG. 6 may be satisfied from data in cache 330.

Device status table 320 is as shown in FIG. 3: device status table 320 stores information about the statuses (low power mode or active power mode) of each of storage devices 125-1 through 125-8 of FIG. 3. Device status table 320 may also store protocol state 410 of FIG. 4, if protocol state 410 of FIG. 4 is used in sending KA response 505 of FIG. 5 to remote processor 145 of FIG. 1.

Switch programming logic 710 may generate the instructions for switch 315 of FIG. 3 to modify routing table 325 for storage devices 125-1 through 125-8 of FIG. 3 that are in low power mode. Keep-Alive logic 715 may generate KA response 505 of FIG. 5 to send to remote processor 145 of FIG. 1 after remote processor 145 of FIG. 1 sends KA message 305 of FIG. 3. Keep-Alive logic 715 may use the protocol state information provided by storage devices 125-1 through 125-8 of FIG. 3 in generating KA response 505 of FIG. 5. For the most part, it may be expected that KA response 505 of FIG. 5 will vary very little, except for the "source" of KA response 505 of FIG. 5 being the storage device and potentially including the protocol state of the storage device, making Keep-Alive logic 715 simple to implement.

In embodiments of the inventive concept that include cache 330, BMC 310 may also include data processing logic 720. Data processing logic 720 may process data requests, such as data request 605 of FIG. 6, received by BMC 310 on behalf of storage device 125-1 of FIG. 3 from remote processor 145 of FIG. 1, when storage device 125-1 of FIG. 3 is in low power mode. Data processing logic 720 may access data present in cache 330 (for read requests), or may store data in cache 330 (for write requests), and return results to remote processor 145 of FIG. 1, without returning storage device 125-1 of FIG. 3 to an active power mode. (Of course, if cache 330 is operating as a write-through cache, or if the data requested is not present in cache 330, BMC 310 may forward data request 605 of FIG. 6 to storage device 125-1 of FIG. 1, returning storage device 125 of FIG. 1 to an active power mode, to process data request 605 of FIG. 6.) Data processing logic 720 therefore operates similarly to other logics that check caches (and other storage formats) for data that may be accessible from faster storages than the one to which the data request was originally directed.

Switch programming logic 710, Keep-Alive logic 715, and data processing logic 720 may be implemented using any desired implementation. For example, switch programming logic 710, Keep-Alive logic 715, and data processing logic 720 may be implemented as circuits, possibly using a Field Programmable Gate Array (FPGA) or an Application-Specific Integrated Circuit (ASIC). Or, switch programming logic 710, Keep-Alive logic 715, and data processing logic 720 may be implemented as software, designed to be executed by a processor (not shown as part of BMC 310 in FIG. 7).

Figure 8:
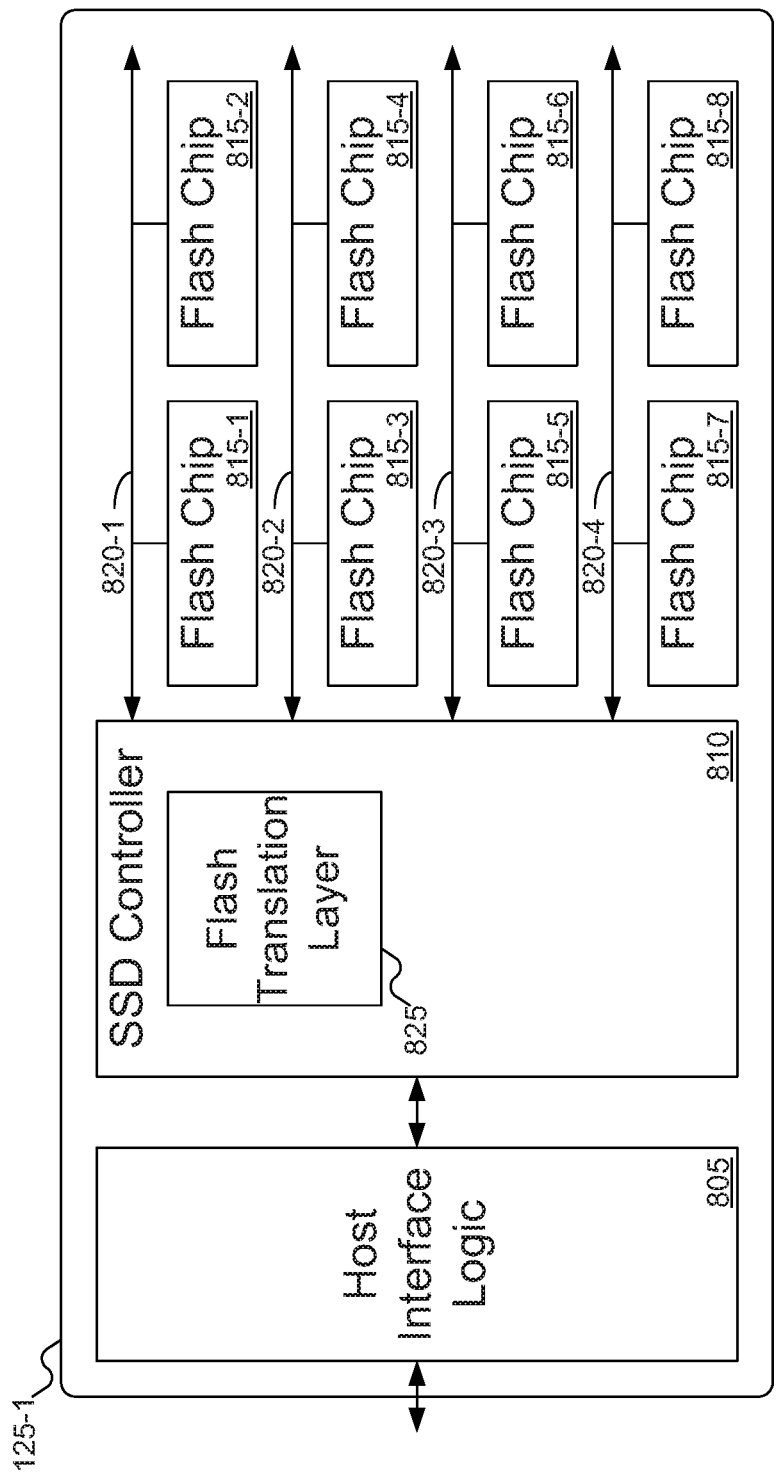
FIG. 8 shows various components in a Solid State Drive (SSD) as the storage device of FIG. 1.

FIG. 8 shows various components in a Solid State Drive (SSD) as storage device 140 of FIG. 1. In FIG. 8, SSD 125-1 may include host interface logic 805, SSD controller 810, and various flash memory chips 815-1 through 815-8, which may be organized into various channels 820-1 through 820-4. Host interface logic 805 may manage communications between SSD 125-1 and machine 105 of FIG. 1. SSD controller 810 may manage the read and write operations, along with garbage collection and other operations, on flash memory chips 815-1 through 815-8.

SSD controller 810 may include flash translation layer 825. Flash translation layer 825 may perform the conventional functions of translating logical block addresses (LBAs), as used by machine 105 of FIG. 1, into physical block addresses (PBAs) of data stored in SSD 125-1.

While FIG. 8 shows SSD 120 as including eight flash memory chips 815-1 through 815-8 organized into four channels 820-1 through 820-4, embodiments of the inventive concept may support any number of flash memory chips organized into any number of channels.

Figure 9:
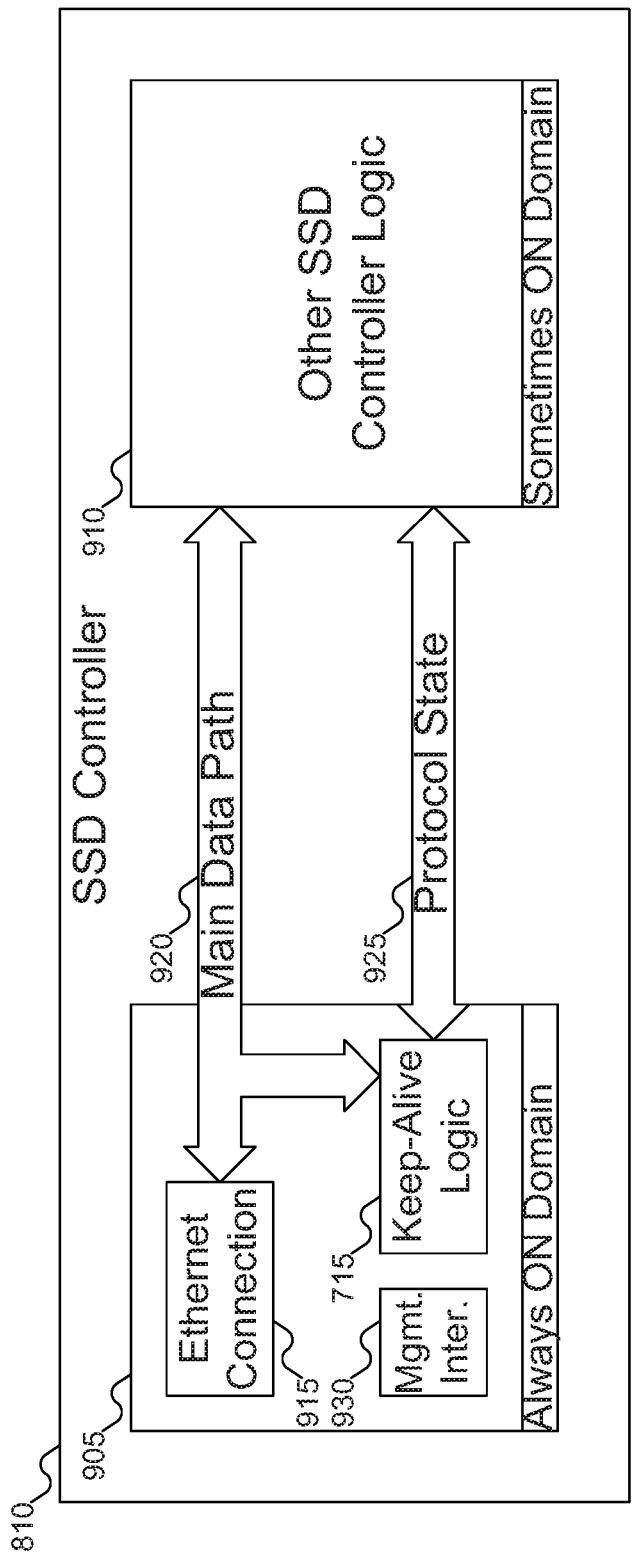
FIG. 9 shows the SSD controller of FIG. 8 with multiple power domains.

FIG. 9 shows SSD controller 810 of FIG. 8 with multiple power domains. In FIG. 9, SSD controller 810 is shown as including two power domains. Power domain 905 is an "always on" power domain: that is, regardless of whether SSD 125-1 of FIG. 3 is in an active power mode or a low power mode (or any other power mode, if more than two power modes are used), SSD 125-1 of FIG. 3 draws enough power for circuitry in the "always on" power domain to function. "Always on" power domain 905 may be used to implement the Inter-Integrated Circuit (I2C) management bus, which is always on as well.

In comparison with "always on" power domain 905, SSD controller 810 may also include "sometimes on" power domain 910. "Sometimes on" power domain 905 represents a power domain that may not operate when the storage device is in low power mode (and potentially other modes, if more than two power modes are supported).

The "always on" power domain may include Ethernet connection 915. Ethernet connection 915 enables the SSD to communicate (over Ethernet) with other components inside and outside machine 105. Since SSD 125-1 of FIG. 3 may receive a signal from BMC 310 of FIG. 3 (or another component, such as switch 315 of FIG. 3) to "wake up", Ethernet connection 915 should be operating regardless of the power mode of SSD 125-1 of FIG. 3: hence its placement in "always on" power domain 905. Other components, such as flash translation layer 825 and circuitry that reads and writes data from the data chips, are needed only when SSD 125-1 of FIG. 3 is in the active power mode, and may be placed in "sometimes on" power domain 910.

Because all traffic from outside storage device 125-1 of FIG. 3 moves through circuitry in "always on" power domain 905 before reaching circuitry in "sometimes on" power domain 910, main data path 920 provides for delivery of requests to "sometimes on" power domain 910 for processing by storage device 125-1 of FIG. 3.

An advantage of "always on" power domain 905 is that storage device 125-1 of FIG. 3 may be capable of responding to management commands. For example, processor 110 of FIG. 1 or BMC 310 of FIG. 3 might send a query to storage device 125-1 of FIG. 3 to perform a health check. This query, rather than going through Ethernet connection 915, might come through an out-of-band connection, such as the System Management Bus (SMBus). Since such a query does not require accessing data from data chips 815-1 through 815-8 of FIG. 8, storage device 125-1 of FIG. 3 does not need to be in active power mode to respond. Instead, circuitry in "always on" power domain 905 may process the query and respond to the management command without leaving low power mode.

In some embodiments of the inventive concept, "always on" power domain 905 may also include Keep-Alive logic 715. Keep-Alive logic 715, when included in SSD controller 810, operates similarly to Keep-Alive logic 715 when included in BMC 310 of FIG. 7: Keep-Alive logic 715 provides a mechanism by which storage device 125-1 of FIG. 3 may respond to KA message 305 of FIG. 3 from remote processor 145 of FIG. 1, even when in a low power mode. Since "always on" power domain 905 is always active, Keep-Alive logic 715 is active even when storage device 125-1 of FIG. 3 is in low power mode. Thus, by including Keep-Alive logic 715 in "always on" power domain 905, storage device 125-1 of FIG. 3 may be able to respond to KA message 305 of FIG. 3 even when in low power mode, thus obviating the need for BMC 310 of FIG. 3 to handle KA message 305 of FIG. 3 on behalf of storage device 125-1 of FIG. 3. Before storage device 125-1 of FIG. 3 enters low power mode, circuitry in "sometimes on" power domain 910 may send protocol state 925 to Keep-Alive logic 715, so that Keep-Alive logic 715 may include the protocol state of storage device 125-1 of FIG. 3 when responding to KA message 305 of FIG. 3.

In some embodiments of the inventive concept, "always on" power domain 905 may also include management interface 930. Management interface 930 provides an interface to storage device 125-1 of FIG. 3 for accessing management functions. In this context, "management functions" is intended to mean functions offered by storage device 125-1 that relate to the management of storage device 125-1, rather than operations that involve data stored on storage device 125-1. Examples of management functions may include health inquiries from processor 110 of FIG. 1, KA message 305 of FIG. 3, inquiries regarding the available capacity of storage device 125-1 of FIG. 3 or how close storage device 125-1 of FIG. 3 is to expecting cells to fail from wear (some storage devices, such as SSDs, have relatively predictable limits to the number of times cells may be written to before the cells start to malfunction), and so on. Management interface 930 may be accessed via any desired bus: SMBus and I2C busses are often used to access management functions of storage device 125-1 of FIG. 3.

Figure 10A:
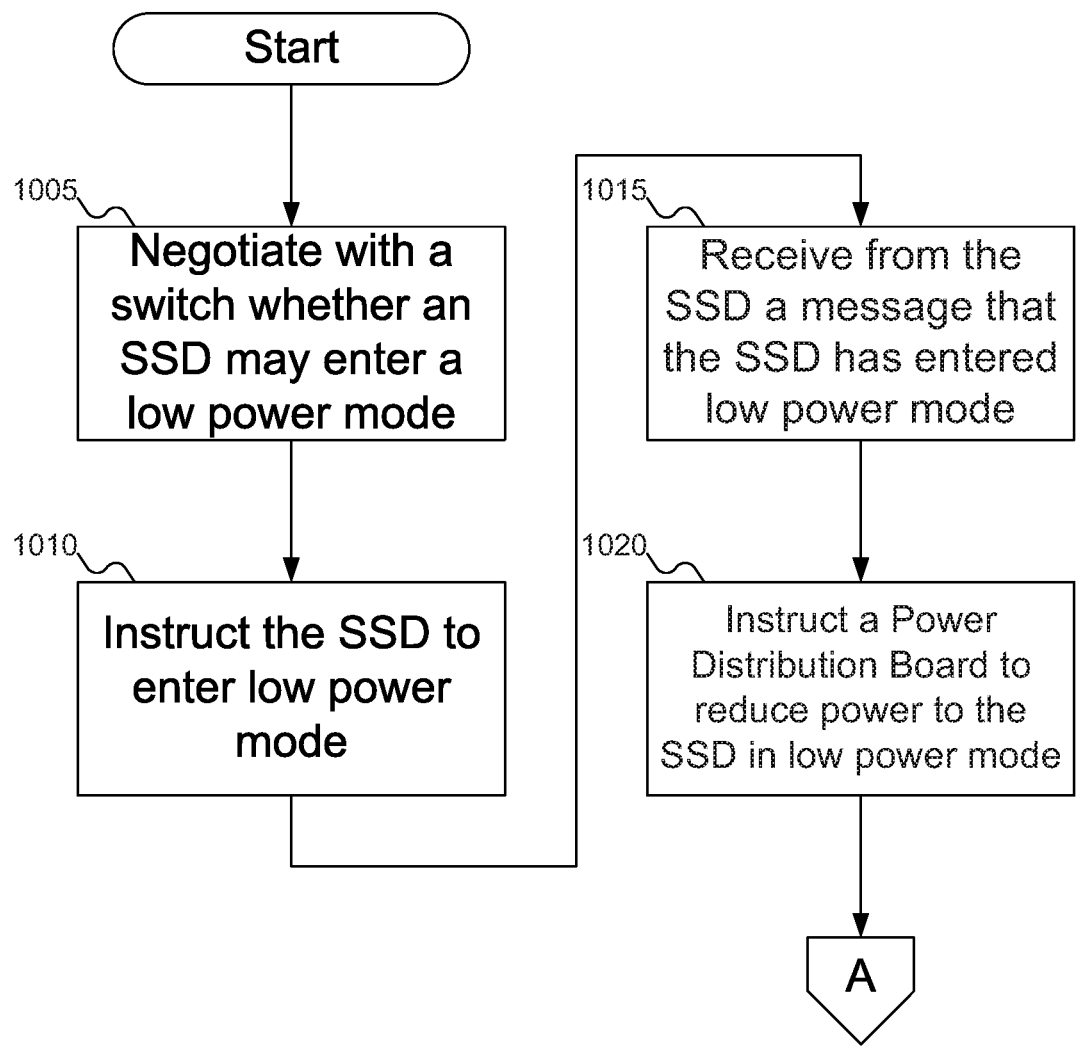
FIGS. 10A-10B show a flowchart of an example procedure for the BMC of FIG. 3 to respond to KA messages from the remote processor of FIG. 1, according to an embodiment of the inventive concept.
Figure 10B:
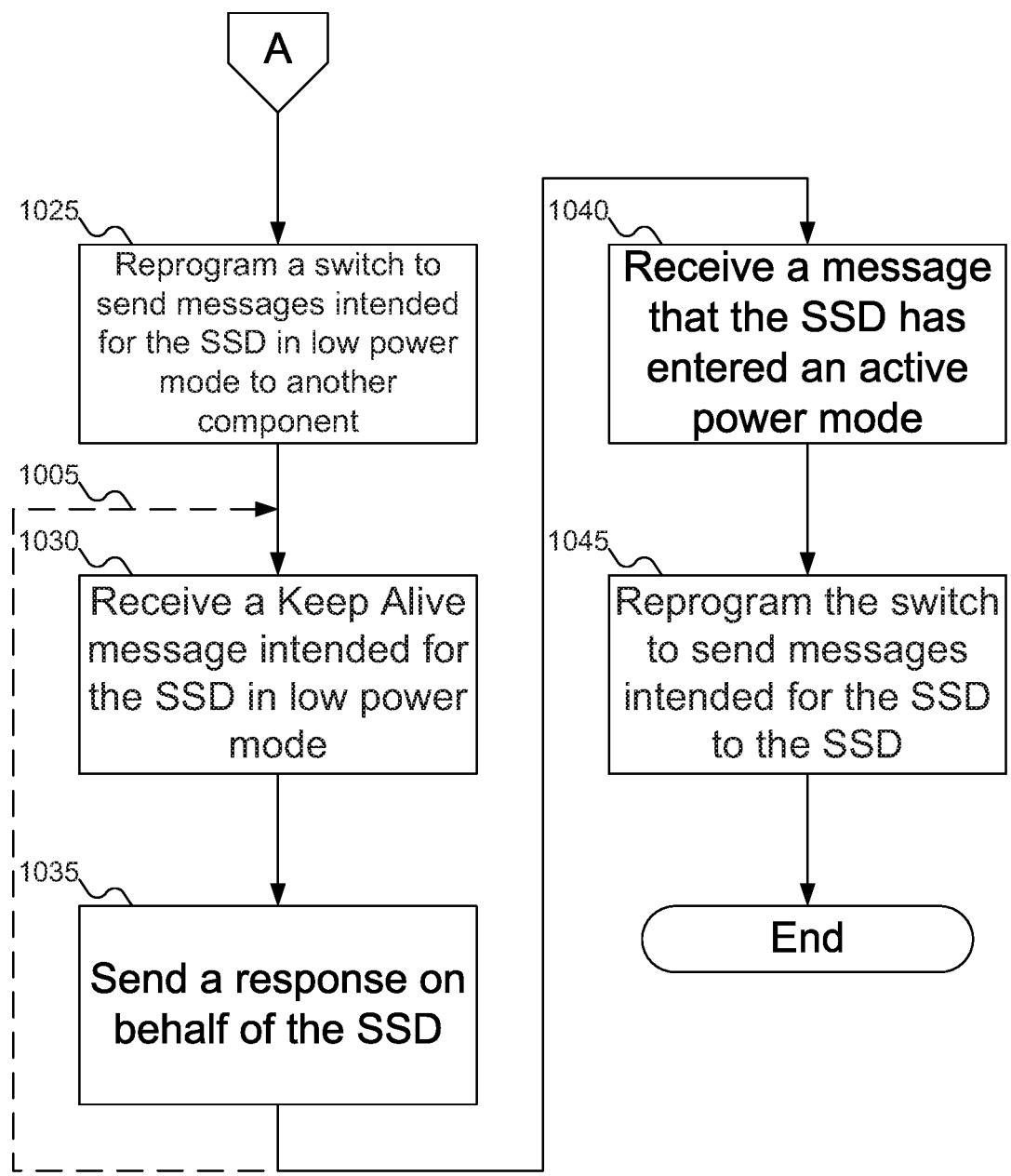

FIGS. 10A-10B show a flowchart of an example procedure for BMC 310 of FIG. 3 to respond to KA messages 305 of FIG. 3 from remote processor 145 of FIG. 1, according to an embodiment of the inventive concept. In FIG. 10A, at block 1005, switch 315 of FIG. 3 and BMC 310 of FIG. 3 may negotiate whether storage device 125-1 of FIG. 3 may enter low power mode. Note that block 1005 may be replaced with any equivalent determination that a particular storage device may enter low power mode: for example, storage device 125-1 of FIG. 3 may determine that it or a secondary storage device (such as storage device 125-2 of FIG. 3) may enter low power mode. At block 1010, BMC 310 of FIG. 3 may instruct storage device 125-1 to enter low power mode. At block 1015, BMC 310 may receive from storage device 125-1 of FIG. 3 a message that storage device 125-1 of FIG. 3 has entered low power mode. At block 1020, BMC 310 of FIG. 3 may instruct a PDB to reduce the power to storage device 125-1 of FIG. 3.

At block 1025 (FIG. 10B), BMC 310 of FIG. 3 may reprogram switch 315 of FIG. 3 to route transmissions intended for storage device 125-1 of FIG. 3 to BMC 310 of FIG. 3 instead. At block 1030, BMC 310 may receive KA message 305 of FIG. 3 from remote processor 145 of FIG. 1. At block 1035, BMC 310 may send KA response 505 of FIG. 5 to remote processor 145 of FIG. 3 on behalf of storage device 125-1 of FIG. 3. As indicated by dashed line 1005, BMC 310 may repeat blocks 1030 and 1035 as needed for multiple KA messages 305 of FIG. 3. At block 1040, BMC 310 may receive from storage device 125-1 of FIG. 3 that storage device 125-1 of FIG. 3 has entered active power mode. At block 1045, BMC 310 may reprogram switch 315 of FIG. 3 to no longer send transmissions intended for storage device 125-1 of FIG. 3 to BMC 310 of FIG. 3, but to deliver those transmissions to storage device 125-1 of FIG. 3.

Figure 11:
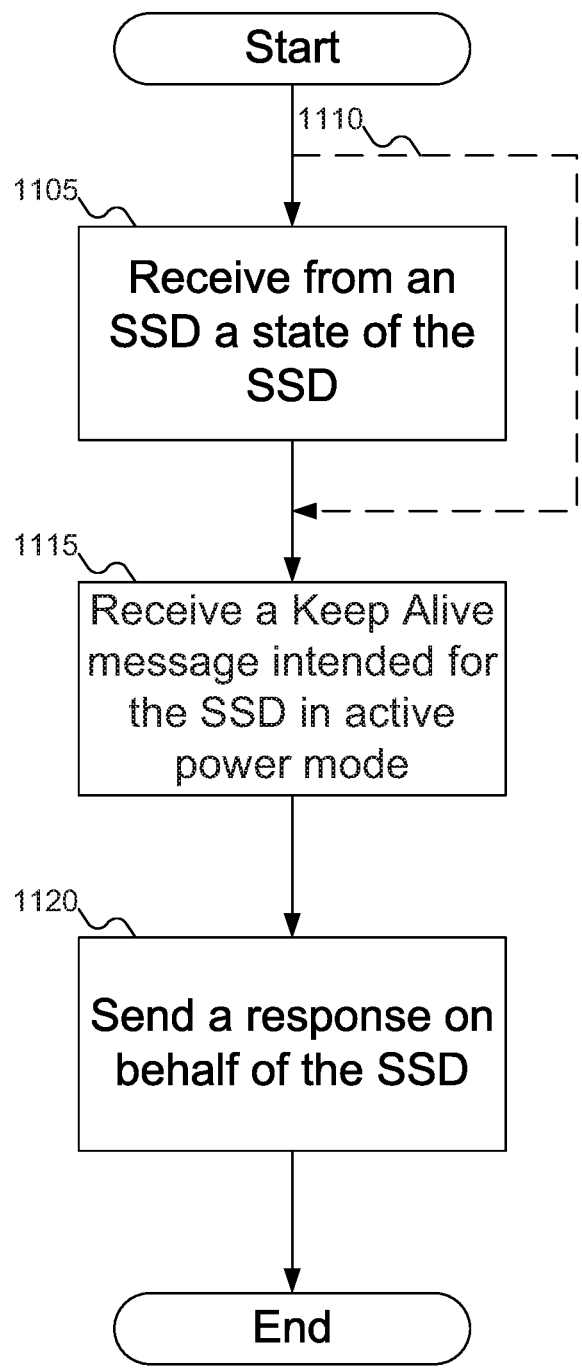
FIG. 11 shows a flowchart of an example procedure for the BMC of FIG. 3 to respond to KA messages from the remote processor of FIG. 1 for the storage device of FIG. 1 in an active power mode, according to an embodiment of the inventive concept.

FIG. 11 shows a flowchart of an example procedure for BMC 310 of FIG. 3 to respond to KA messages 305 of FIG. 3 from remote processor 145 of FIG. 1 for storage device 125 of FIG. 1 in an active power mode, according to an embodiment of the inventive concept. In FIG. 11, at block 1105, BMC 310 of FIG. 3 may receive the protocol state of storage device 125-1 of FIG. 3. As shown by dashed line 1110, block 1105 may be omitted if the protocol state of storage device 125-1 of FIG. 3 is not needed. At block 1115, BMC 310 of FIG. 3 may receive KA message 305 of FIG. 3 from remote processor 145 of FIG. 1. At block 1120, BMC 310 of FIG. 3 may send KA response 505 of FIG. 5 to remote processor 145 of FIG. 1: KA response 505 of FIG. 5 may include the protocol state of storage device 125-1 of FIG. 3.

Figure 12A:
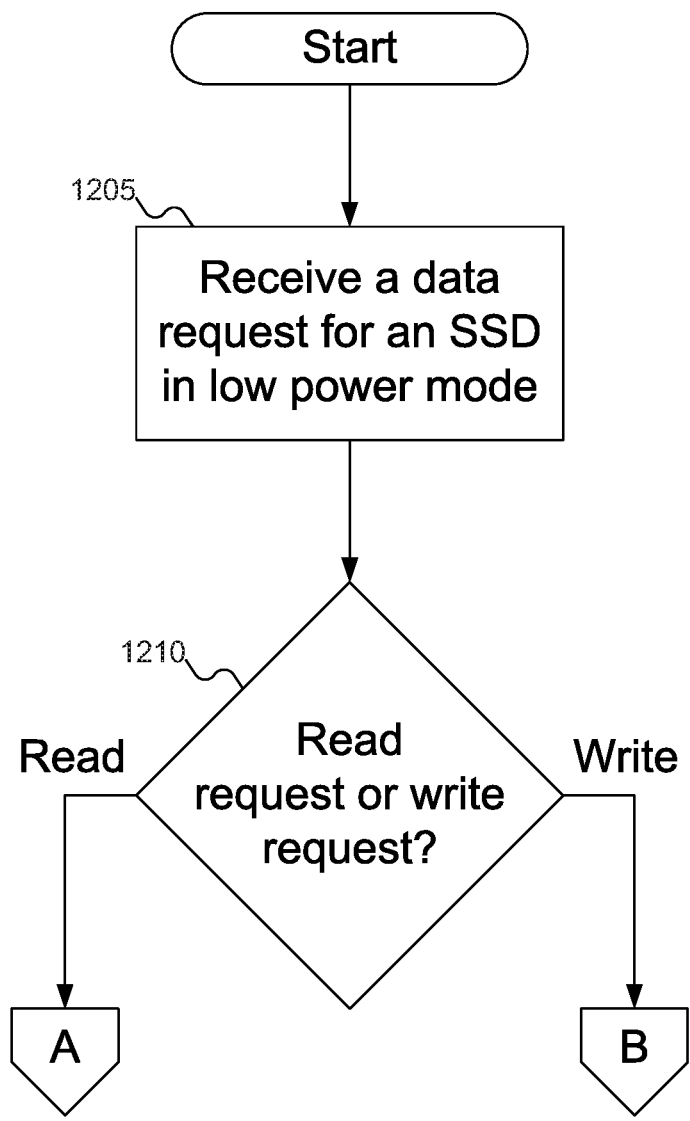
FIGS. 12A-12C show a flowchart of an example procedure for the BMC of FIG. 3 to respond to a data request from the remote processor of FIG. 1 on behalf of the storage device of FIG. 1 using the cache of FIG. 3, according to an embodiment of the inventive concept.
Figure 12B:
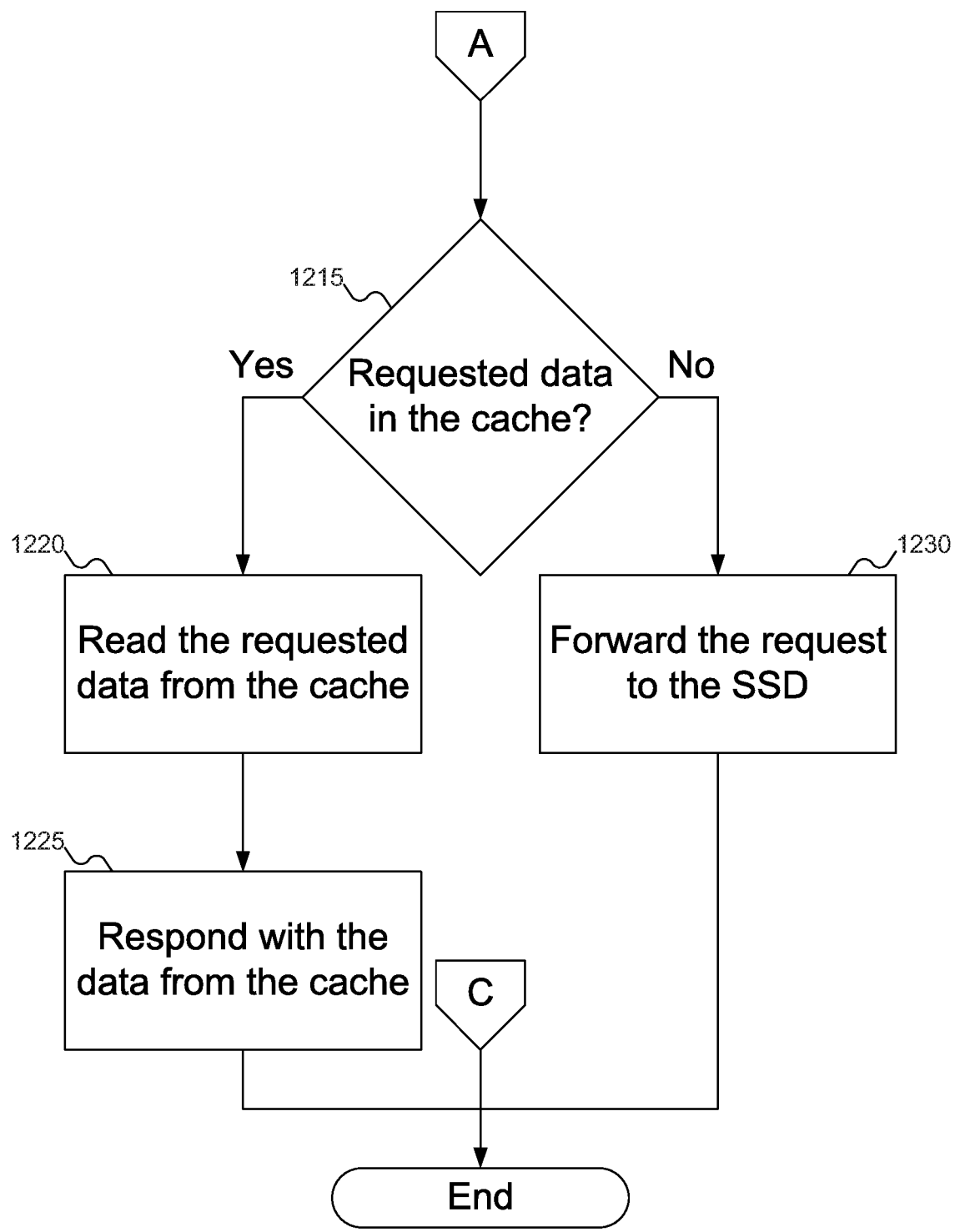
Figure 12C:
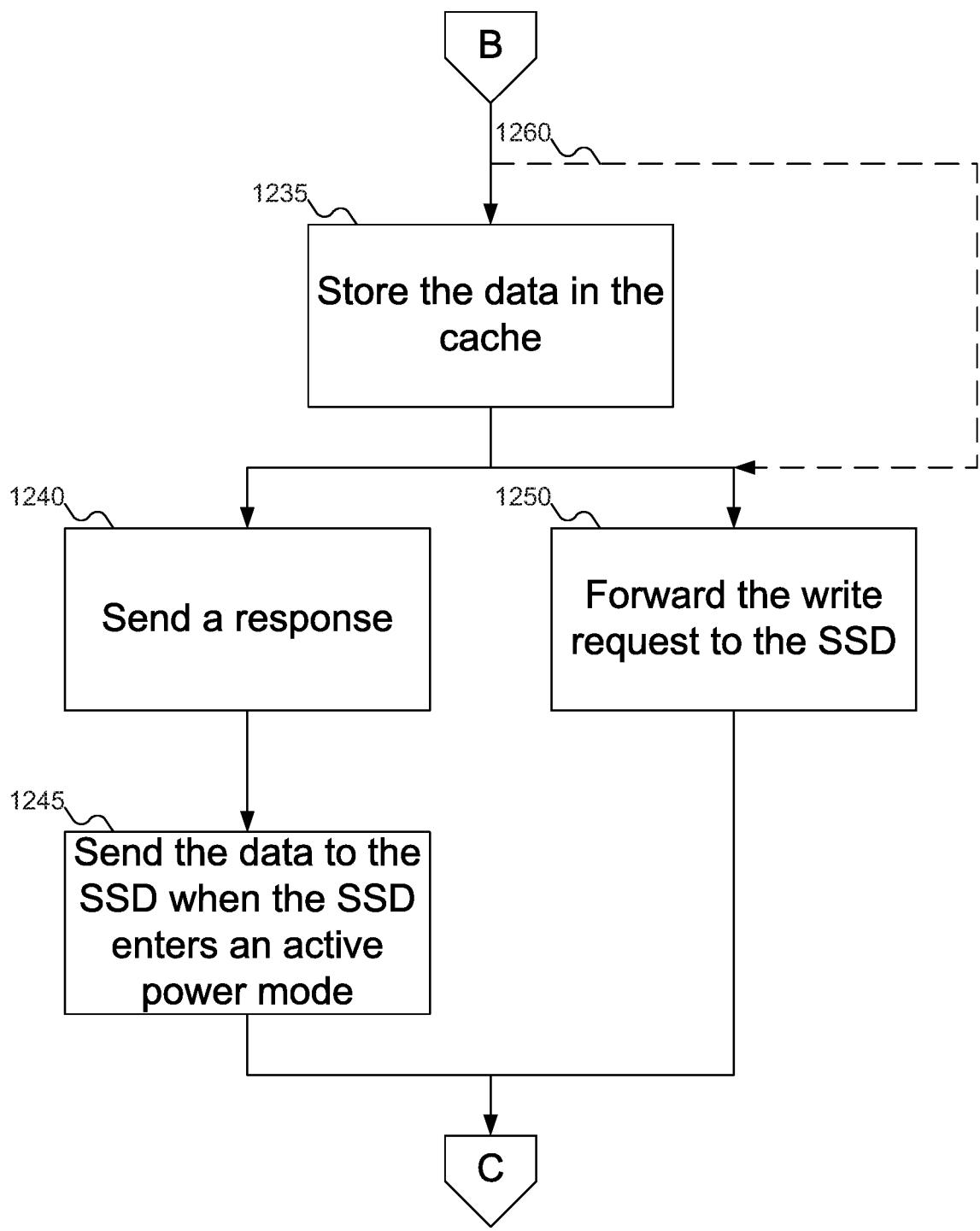

FIGS. 12A-12C show a flowchart of an example procedure for BMC 310 of FIG. 3 to respond to data request 605 of FIG. 6 from remote processor 145 of FIG. 1 on behalf of storage device 125 of FIG. 1 using cache 330 of FIG. 3, according to an embodiment of the inventive concept. In FIGS. 12A-12C, it is assumed that storage device 125-1 of FIG. 3 is in a low power mode: if storage device 125-1 of FIG. 3 is in an active power mode then storage device 125-1 of FIG. 3 may respond to data request 605 of FIG. 6 without needing BMC 310 of FIG. 3 to participate. In FIG. 12A, at block 1205, BMC 310 of FIG. 3 may receive data request 605 of FIG. 6 from remote processor 145 of FIG. 1. At block 1210, BMC 310 of FIG. 3 may determine whether data request 605 of FIG. 6 is a read request or a write request.

If data request 605 of FIG. 6 is a read request, then at block 1215 (FIG. 12B) BMC 310 of FIG. 3 may determine whether the requested data is in cache 330 of FIG. 3. If the requested data is in cache 330 of FIG. 3, then at block 1220 BMC 310 of FIG. 3 may read the requested data from cache 330 of FIG. 3, and at block 1225 BMC 310 of FIG. 3 may send data response 610 of FIG. 6, including the requested data, to remote processor 145 of FIG. 1 on behalf of storage device 125-1 of FIG. 3, without returning storage device 125-1 of FIG. 3 to an active power mode. Otherwise, if the requested data is not in cache 330 of FIG. 3, then at block 1230 BMC 310 of FIG. 3 may forward data request 605 of FIG. 6 to storage device 125-1 of FIG. 3 to respond to data request 605 of FIG. 6: this may involve storage device 125-1 of FIG. 3 returning to an active status (with BMC 310 of FIG. 3 then performing blocks 1040 and 1045 of FIG. 10B as a consequence).

On the other hand, if data request 605 of FIG. 6 is a write request, then at block 1235 (FIG. 12C), BMC 310 of FIG. 3 may store the data in cache 330 of FIG. 3. Then, if cache 330 of FIG. 3 is used as a write-back cache, at block 1240 BMC 310 of FIG. 3 may send data response 610 of FIG. 6 back to remote processor 145 of FIG. 1 on behalf of storage device 125-1 of FIG. 3. Then, when storage device 125-1 of FIG. 3 returns to active power mode, at block 1245 BMC 310 of FIG. 3 may send the data to storage device 125-1 of FIG. 3 to finish the write request.

On the other hand, if cache 330 of FIG. 3 is used as a write-through cache, then at block 1250 BMC 310 of FIG. 3 may forward the write request to storage device 125-1 of FIG. 3 to respond to the write request: this may involve storage device 125-1 of FIG. 3 returning to an active status (with BMC 310 of FIG. 3 then performing blocks 1040 and 1045 of FIG. 10B as a consequence). Note that if cache 330 of FIG. 3 is not present, then block 1235 may be omitted and processing continue with block 1255, as shown by dashed line 1160 (if cache 330 of FIG. 3 is not present, blocks 1240 and 1245 may not be performed, as they depend on the presence of cache 330 of FIG. 3).

Figure 13:
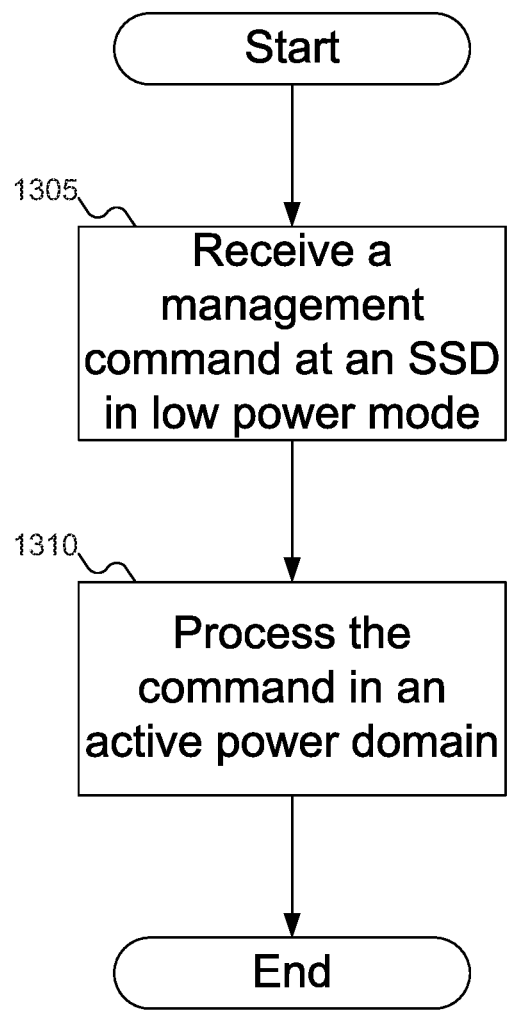
FIG. 13 shows a flowchart of an example procedure for the storage device of FIG. 1 to respond to management commands using an active power domain, according to an embodiment of the inventive concept.

FIG. 13 shows a flowchart of an example procedure for storage device 125 of FIG. 1 to respond to management commands using an active power domain, according to an embodiment of the inventive concept. In FIG. 13, at block 1305, storage device 125-1 of FIG. 3 may be in low power mode and receive a management command. Note that this management command might be, for example, a health check or KA message 305 of FIG. 3 (if storage device 125-1 of FIG. 3 includes Keep-Alive logic 715 of FIG. 9). At block 1310, storage device 125-1 of FIG. 3 may process the management command in an active power domain even though storage device 125-1 of FIG. 3 is in low power mode.

In FIGS. 10A-12, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. Using a component, such as a BMC, other than the storage device itself to respond to KA messages enables the storage device to enter a low power mode, reducing the power consumption of the system. For example, in a system with 24 storage devices, 12 of which are mirrors of the other 12, where the storage devices consume 25 Watts in active power mode but only 3.3 Watts in low power mode, putting the mirror devices into a low power mode may save $12*(25-3.3)=260.4$ Watts: a significant power savings.

Embodiments of the inventive concept also enable the BMC or other components to respond to KA messages on behalf of storage devices that do not include the native ability to respond to KA messages. This configuration enables storage devices that do not include native KA response ability to be used in RDAS systems where KA messages are used to make sure the storage devices are still present. This configuration may also be used to off-load responding to KA messages even for storage devices that that include native KA response ability.

Embodiments of the inventive concept also enable the BMC or other component to use a cache to respond to data requests from the remote processor. By using the cache to respond to data requests (either read requests or write requests), storage devices that are in low power mode may remain in low power mode longer, rather than being brought into active power mode to handle the data request.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising: a chassis;

a processor in the chassis;

a switch in the storage device; and at least one storage device in the chassis, the at least one storage device in communication with a remote processor not located in the chassis using the switch, the at least one storage device supporting an active power mode and a low power mode, wherein a response to a Keep Alive (KA) message sent from the remote processor to the at least one storage device may be sent to the remote processor on behalf of the at least one storage device when the at least one storage device is in the low power mode.

Statement 2. An embodiment of the inventive concept includes the system according to statement 1, wherein the at least one storage device includes a Non-Volatile Memory Express (NVMe) over Fabrics (NVMe-oF) Solid State Drive (SSD).

Statement 3. An embodiment of the inventive concept includes the system according to statement 2, wherein the response to the KA message may be sent by one of the processor, the switch, and a Baseboard Management Controller (BMC).

Statement 4. An embodiment of the inventive concept includes the system according to statement 2, wherein a BMC may reprogram the switch to redirect commands addressed to the at least one NVMe-oF SSD in the low power mode to the BMC.

Statement 5. An embodiment of the inventive concept includes the system according to statement 4, wherein the at least one NVMe-oF SSD is operative to inform the BMC when the at least one NVMe-oF SSD is entering the low power mode.

Statement 6. An embodiment of the inventive concept includes the system according to statement 5, wherein the BMC is operative to reprogram the switch to redirect commands addressed to the at least NVMe-oF SSD to the BMC responsive to the at least one NVMe-oF SSD informing the BMC when the at least one NVMe-oF SSD entering the low power mode.

Statement 7. An embodiment of the inventive concept includes the system according to statement 5, wherein the BMC is operative to instruct the at least one NVMe-oF SSD to enter the low power mode and to instruct a Power Distribution Board (PDB) to reduce power sent to the at least one NVMe-oF SSD.

Statement 8. An embodiment of the inventive concept includes the system according to statement 5, wherein:

the at least one NVMe-oF SSD is further operative to inform the BMC of a protocol state of the at least one NVMe-oF SSD when the at least one NVMe-oF SSD is entering the low power mode; and the BMC is operative to include the protocol state of the at least one NVMe-oF SSD in the response to the KA message.

Statement 9. An embodiment of the inventive concept includes the system according to statement 5, wherein:

the switch and the BMC are operative to negotiate the BMC handling the KA message on behalf of the at least one NVMe-oF SSD; and the switch is operative to redirect the KA message from the at least one NVMe-oF SSD to the BMC.

Statement 10. An embodiment of the inventive concept includes the system according to statement 9, wherein the switch and the BMC are further operative to negotiate the BMC handling the KA message on behalf of the at least one NVMe-oF SSD based at least in part on an activity level for the at least one NVMe-oF SSD determined by the switch.

Statement 11. An embodiment of the inventive concept includes the system according to statement 4, wherein the BMC includes a cache.

Statement 12. An embodiment of the inventive concept includes the system according to statement 11, wherein the BMC is operative to respond to a read request sent by the remote processor to the at least one NVMe-oF SSD on behalf of the at least one NVMe-oF SSD without the at least one NVMe-oF SSD entering the active power mode based at least in part on a data requested in the read request is present in the cache.

Statement 13. An embodiment of the inventive concept includes the system according to statement 11, wherein the BMC is operative to respond to a write request sent by the remote processor to the at least one NVMe-oF SSD on behalf of the at least one NVMe-oF SSD without the at least one NVMe-oF SSD entering the active power mode.

Statement 14. An embodiment of the inventive concept includes the system according to statement 13, wherein the BMC is operative to store a write data sent in the write request in the cache and to send the write data to the at least one NVMe-oF SSD when the at least one NVMe-oF SSD enters the active power mode.

Statement 15. An embodiment of the inventive concept includes the system according to statement 4, wherein the BMC may reprogram the switch to direct commands addressed to the at least one NVMe-oF SSD in the active power mode to the at least one NVMe-oF SSD.

Statement 16. An embodiment of the inventive concept includes the system according to statement 2, wherein one of a processor, a switch, and a BMC may respond to a second KA message sent from the remote processor to the at least one NVMe-oF SSD when the at least one NVMe-oF SSD is in the active power mode.

Statement 17. An embodiment of the inventive concept includes the system according to statement 16, wherein the at least one NVMe-oF SSD is not operative to respond to the second KA message.

Statement 18. An embodiment of the inventive concept includes the system according to statement 16, wherein the at least one NVMe-oF SSD is operative to keep the one of the processor, the switch, and the BMC informed of a protocol state of the at least one NVMe-oF SSD.

Statement 19. An embodiment of the inventive concept includes the system according to statement 2, wherein a BMC is operative to send a management command to the at least one NVMe-oF SSD when the at least one NVMe-oF SSD is in the low power mode and without the at least one NVMe-oF SSD entering the active power mode.

Statement 20. An embodiment of the inventive concept includes the system according to statement 19, wherein the BMC is operative to send the management commands to the at least one NVMe-oF SSD using an out-of-band mechanism.

Statement 21. An embodiment of the inventive concept includes the system according to statement 20, wherein the out-of-band mechanism includes a System Management Bus (SMBus).

Statement 22. An embodiment of the inventive concept includes the system according to statement 19, wherein the at least one NVMe-oF SSD includes a power domain that is active even when the at least one NVMe-oF SSD is in the low power mode.

Statement 23. An embodiment of the inventive concept includes the system according to statement 2, wherein the response to the KA message may be sent by the at least one NVMe-oF SSD while the at least one NVMe-oF SSD is in the low power mode.

Statement 24. An embodiment of the inventive concept includes the system according to statement 23, wherein the at least one NVMe-oF SSD includes a KA Logic circuit that is active even when the at least one NVMe-oF SSD is in the low power mode.

Statement 25. An embodiment of the inventive concept includes an apparatus, comprising:

a receiver to receive a Keep-Alive (KA) message from a remote processor, the KA message intended for a storage device;

a Keep-Alive logic to generate a KA response to the KA message; and a transmitter to send a KA response to the remote processor on behalf of the storage device.

Statement 26. An embodiment of the inventive concept includes the apparatus according to statement 25, wherein the apparatus is drawn from a set including a processor and a Baseboard Management Controller (BMC).

Statement 27. An embodiment of the inventive concept includes the apparatus according to statement 25, wherein the storage device includes a Non-Volatile Memory Express over Fabrics (NVMe-oF) Solid State Drive (SSD).

Statement 28. An embodiment of the inventive concept includes the apparatus according to statement 27, further comprising a device status table storing information about a status of the NVMe-oF SSD.

Statement 29. An embodiment of the inventive concept includes the apparatus according to statement 28, wherein the device status table is operative to store information about statuses of a plurality of NVMe-oF SSDs.

Statement 30. An embodiment of the inventive concept includes the apparatus according to statement 28, wherein the device status table is operative to store a protocol state of the NVMe-oF SSD.

Statement 31. An embodiment of the inventive concept includes the apparatus according to statement 30, wherein the Keep-Alive logic is operative to generate the KA response to the KA message responsive to the protocol state stored in the device status table.

Statement 32. An embodiment of the inventive concept includes the apparatus according to statement 27, wherein the receiver is operative to receive the KA message from the remote processor via a switch.

Statement 33. An embodiment of the inventive concept includes the apparatus according to statement 32, further comprising a switch programming logic to instruct the switch to modify a routing table to route the KA message from the remote processor intended for the NVMe-oF SSD to the apparatus.

Statement 34. An embodiment of the inventive concept includes the apparatus according to statement 27, further comprising a cache.

Statement 35. An embodiment of the inventive concept includes the apparatus according to statement 34, wherein:

the receiver is operative to receive a read request from the remote processor intended for the NVMe-oF SSD when the NVMe-oF SSD is in a low power mode;

the apparatus further comprises a data processing logic operative to generate a data response to the read request sent by the remote processor and intended for the NVMe-oF SSD on behalf of the NVMe-oF SSD without the NVMe-oF SSD entering the active power mode based at least in part on a data requested in the read request is present in the cache;

and the transmitter is operative to send the data response to the remote processor on behalf of the NVMe-oF SSD.

Statement 36. An embodiment of the inventive concept includes the apparatus according to statement 34, wherein:

the receiver is operative to receive a write request from the remote processor intended for the NVMe-oF SSD when the NVMe-oF SSD is in a low power mode;

the apparatus further comprises a data processing logic operative to generate a data response to the write request sent by the remote processor and intended for the NVMe-oF SSD on behalf of the NVMe-oF SSD without the NVMe-oF SSD entering the active power mode using the cache;

and the transmitter is operative to send the data response to the remote processor on behalf of the NVMe-oF SSD.

Statement 37. An embodiment of the inventive concept includes a Non-Volatile Memory Express (NVMe) over Fabrics (NVMe-oF) Solid State Drive (SSD), comprising:

storage for data;

a host interface logic to receive commands from a processor, the commands including data requests and management commands; and an SSD controller to process the commands, the SSD controller including an "always on" power domain to process the management commands and a "sometimes on" power domain to process the data requests.

Statement 38. An embodiment of the inventive concept includes the NVMe-oF SSD according to statement 37, wherein the "always on" power domain includes:

an Ethernet connection to connect the NVMe-oF SSD to the processor; and a Keep-Alive logic operative to generate a Keep Alive (KA) response to a KA message even when the NVMe-oF SSD is in a low power mode.

Statement 39. An embodiment of the inventive concept includes the NVMe-oF SSD according to statement 38, wherein the "always on" power domain further includes a management interface to respond to other management commands than the KA message.

Statement 40. An embodiment of the inventive concept includes the NVMe-oF SSD according to statement 39, wherein the management interface is connected to a bus drawn from a set including an Inter-Integrated Circuit (I2C) bus and a System Management Bus (SMBus).

Statement 41. An embodiment of the inventive concept includes a method, comprising:

receiving a Keep Alive (KA) message sent from a remote processor to a storage device in a low power mode; and sending a response to the KA message to the remote processor on behalf of the storage device.

Statement 42. An embodiment of the inventive concept includes the method according to statement 41, wherein:

receiving a Keep Alive (KA) message sent from a remote processor to a storage device in a low power mode includes receiving the KA message sent from the remote processor to a Non-Volatile Memory Express (NVMe) over Fabrics (NVMe-oF) Solid State Drive (SSD) in the low power mode; and sending a response to the KA message to the remote processor on behalf of the storage device includes sending the response to the KA message to the remote processor on behalf of the NVMe-oF SSD.

Statement 43. An embodiment of the inventive concept includes the method according to statement 42, wherein:

receiving the KA message sent from the remote processor to a Non-Volatile Memory Express (NVMe) over Fabrics (NVMe-oF) Solid State Drive (SSD) in the low power mode includes receiving the KA message sent from the remote processor to the NVMe-oF SSD in the low power mode at a component other than the NVMe-oF SSD; and sending the response to the KA message to the remote processor on behalf of the NVMe-oF SSD includes sending the response to the KA message to the remote processor from the component on behalf of the NVMe-oF SSD, wherein the component is drawn from a set including a processor, a Baseboard Management Controller (BMC), and a switch.

Statement 44. An embodiment of the inventive concept includes the method according to statement 43, further comprising reprogramming the switch by the component other than the NVMe-oF SSD to direct the KA message to the component other than the NVMe-oF SSD.

Statement 45. An embodiment of the inventive concept includes the method according to statement 44, further comprising receiving from the NVMe-oF SSD at the component other than the NVMe-oF SSD a message that the NVMe-oF SSD is entering the low power mode.

Statement 46. An embodiment of the inventive concept includes the method according to statement 45, wherein reprogramming the switch by the component other than the NVMe-oF SSD to direct the KA message to the component other than the NVMe-oF SSD includes reprogramming the switch by the component other than the NVMe-oF SSD to direct the KA message to the component other than the NVMe-oF SSD responsive to receiving from the NVMe-oF SSD at the component other than the NVMe-oF SSD the message that the NVMe-oF SSD is entering the low power mode.

Statement 47. An embodiment of the inventive concept includes the method according to statement 45, further comprising:

instructing the NVMe-oF SSD to enter the low power mode; and instructing a Power Distribution Board (PDB) to reduce power sent to the NVMe-oF SSD.

Statement 48. An embodiment of the inventive concept includes the method according to statement 45, wherein:

receiving from the NVMe-oF SSD at the component other than the NVMe-oF SSD a message that the NVMe-oF SSD is entering the low power mode includes receiving a protocol state of the NVMe-oF SSD; and the response to the KA message includes the protocol state of the NVMe-oF SSD.

Statement 49. An embodiment of the inventive concept includes the method according to statement 44, further comprising reprogramming the switch by the component other than the NVMe-oF SSD to direct commands to the NVMe-oF SSD responsive to the NVMe-oF SSD is entering an active power mode.

Statement 50. An embodiment of the inventive concept includes the method according to statement 43, further comprising negotiating between the switch and the component other than the NVMe-oF SSD that the component other than the NVMe-oF SSD will respond to the KA message on behalf of the NVMe-oF SSD, wherein the component is drawn from a set including the processor and the BMC.

Statement 51. An embodiment of the inventive concept includes the method according to statement 50, wherein negotiating between the switch and the component other than the NVMe-oF SSD that the component other than the NVMe-oF SSD will respond to the KA message on behalf of the NVMe-oF SSD includes negotiating between the switch and the component other than the NVMe-oF SSD that the component other than the NVMe-oF SSD will respond to the KA message on behalf of the NVMe-oF SSD responsive to an activity level for the NVMe-oF SSD.

Statement 52. An embodiment of the inventive concept includes the method according to statement 43, further comprising:

receiving a second KA message sent from the remote processor to the NVMe-oF SSD in an active power mode at a component other than the NVMe-oF SSD; and sending a second response to the second KA message to the remote processor from the component on behalf of the NVMe-oF SSD.

Statement 53. An embodiment of the inventive concept includes the method according to statement 52, wherein the NVMe-oF SSD is not operative to respond to the second KA message.

Statement 54. An embodiment of the inventive concept includes the method according to statement 52, further comprising receiving from the NVMe-oF SSD at the component other than then NVMe-oF SSD a protocol state of the NVMe-oF SSD in the active power mode.

Statement 55. An embodiment of the inventive concept includes the method according to statement 42, wherein:

receiving the KA message sent from the remote processor to a Non-Volatile Memory Express (NVMe) over Fabrics (NVMe-oF) Solid State Drive (SSD) in the low power mode includes receiving the KA message sent from the remote processor to the NVMe-oF SSD in the low power mode at a KA Logic circuit of the NVMe-oF SSD that is active even when the at least one NVMe-oF SSD is in the low power mode; and sending the response to the KA message to the remote processor on behalf of the NVMe-oF SSD includes sending the response to the KA message to the remote processor from the KA Logic circuit while the NVMe-oF SSD is in the low power mode.

Statement 56. An embodiment of the inventive concept includes the method according to statement 55, wherein the KA Logic circuit is active even when the at least one NVMe-oF SSD is in the low power mode.

Statement 57. An embodiment of the inventive concept includes a method, comprising:

receiving a data request sent from a remote processor to a storage device at a component other than the storage device, the storage device in a low power mode; and based at least in part on a data in the data request is present in a cache local to the component other than the storage device, responding to the data request using the cache local to the component other than the storage device, wherein the component other than the storage device is drawn from a set including a processor, a switch, and a Baseboard Management Controller (BMC).

Statement 58. An embodiment of the inventive concept includes the method according to statement 57, wherein:

receiving a data request sent from a remote processor to a storage device at a component other than the storage device includes receiving the data request sent from the remote processor to a Non-Volatile Memory Express (NVMe) over Fabrics (NVMe-oF) Solid State Drive (SSD) at a component other than the NVMe-oF SSD; and based at least in part on a data in the data request is present in a cache local to the component other than the storage device, responding to the data request using a cache local to the component other than the storage device includes based at least in part on the data in the data request is present in the cache local to the component other than the storage device, responding to the data request using the cache local to the component other than the NVMe-oF SSD.

Statement 59. An embodiment of the inventive concept includes the method according to statement 58, further comprising based at least in part on the data in the data request is not present in the cache local to the component other than the storage device, forwarding the data request to the NVMe-oF SSD.

Statement 60. An embodiment of the inventive concept includes the method according to statement 58, wherein:

the data request includes a read request; and the method further comprises reading the data by the component other than the NVMe-oF SSD from the cache local to the component other than the NVMe-oF SSD without the NVMe-oF SSD entering an active power mode.

Statement 61. An embodiment of the inventive concept includes the method according to statement 58, wherein:

the data request includes a write request; and the method further comprises storing the data by the component other than the NVMe-oF SSD in the cache local to the component other than the NVMe-oF SSD without the NVMe-oF SSD entering an active power mode.

Statement 62. An embodiment of the inventive concept includes the method according to statement 61, further comprising sending the data from the component other than the NVMe-oF SSD to the NVMe-oF SSD when the NVMe-oF SSD is in an active power mode.

Statement 63. An embodiment of the inventive concept includes a method, comprising:

receiving a management command from a component other than a storage device at the storage device, the storage device in a low power mode; and processing the management command using a power domain of the storage device that is active in the low power mode.

Statement 64. An embodiment of the inventive concept includes the method according to statement 63, wherein receiving a management command from a component other than a storage device at the storage device, the storage device in a low power mode includes receiving the management command from the component other than a Non-Volatile Memory Express (NVMe) over Fabrics (NVMe-oF) Solid State Drive (SSD) at the NVMe-oF SSD; and processing the management command using a power domain of the storage device that is active in the low power mode includes processing the management command using the power domain of the NVMe-oF SSD that is active in the low power mode.

Statement 65. An embodiment of the inventive concept includes the method according to statement 64, wherein receiving the management command from the component other than a Non-Volatile Memory Express (NVMe) over Fabrics (NVMe-oF) Solid State Drive (SSD) at the NVMe-oF SSD includes receiving the management command from the component other than the NVMe-oF SSD at the NVMe-oF SSD using an out-of-band mechanism.

Statement 66. An embodiment of the inventive concept includes the method according to statement 65, wherein the out-of-band mechanism includes a System Management Bus (SMBus).

Statement 67. An embodiment of the inventive concept includes an article, comprising a non-transitory storage medium, the non-transitory storage medium having stored thereon instructions that, when executed by a machine, result in:

receiving a Keep Alive (KA) message sent from a remote processor to a storage device in a low power mode; and sending a response to the KA message to the remote processor on behalf of the storage device.

Statement 68. An embodiment of the inventive concept includes the article according to statement 67, wherein:

receiving a Keep Alive (KA) message sent from a remote processor to a storage device in a low power mode includes receiving the KA message sent from the remote processor to a Non-Volatile Memory Express (NVMe) over Fabrics (NVMe-oF) Solid State Drive (SSD) in the low power mode; and sending a response to the KA message to the remote processor on behalf of the storage device includes sending the response to the KA message to the remote processor on behalf of the NVMe-oF SSD.

Statement 69. An embodiment of the inventive concept includes the article according to statement 68, wherein:

receiving the KA message sent from the remote processor to a Non-Volatile Memory Express (NVMe) over Fabrics (NVMe-oF) Solid State Drive (SSD) in the low power mode includes receiving the KA message sent from the remote processor to the NVMe-oF SSD in the low power mode at a component other than the NVMe-oF SSD; and sending the response to the KA message to the remote processor on behalf of the NVMe-oF SSD includes sending the response to the KA message to the remote processor from the component on behalf of the NVMe-oF SSD, wherein the component is drawn from a set including a processor, a Baseboard Management Controller (BMC), and a switch.

Statement 70. An embodiment of the inventive concept includes the article according to statement 69, the non-transitory storage medium having stored thereon further instructions that, when executed by the machine, result in reprogramming the switch by the component other than the NVMe-oF SSD to direct the KA message to the component other than the NVMe-oF SSD.

Statement 71. An embodiment of the inventive concept includes the article according to statement 70, the non-transitory storage medium having stored thereon further instructions that, when executed by the machine, result in receiving from the NVMe-oF SSD at the component other than the NVMe-oF SSD a message that the NVMe-oF SSD is entering the low power mode.

Statement 72. An embodiment of the inventive concept includes the article according to statement 71, wherein reprogramming the switch by the component other than the NVMe-oF SSD to direct the KA message to the component other than the NVMe-oF SSD includes reprogramming the switch by the component other than the NVMe-oF SSD to direct the KA message to the component other than the NVMe-oF SSD responsive to receiving from the NVMe-oF SSD at the component other than the NVMe-oF SSD the message that the NVMe-oF SSD is entering the low power mode.

Statement 73. An embodiment of the inventive concept includes the article according to statement 71, the non-transitory storage medium having stored thereon further instructions that, when executed by the machine, result in:

instructing the NVMe-oF SSD to enter the low power mode; and instructing a Power Distribution Board (PDB) to reduce power sent to the NVMe-oF SSD.

Statement 74. An embodiment of the inventive concept includes the article according to statement 71, wherein:

receiving from the NVMe-oF SSD at the component other than the NVMe-oF SSD a message that the NVMe-oF SSD is entering the low power mode includes receiving a protocol state of the NVMe-oF SSD; and the response to the KA message includes the protocol state of the NVMe-oF SSD.

Statement 75. An embodiment of the inventive concept includes the article according to statement 70, the non-transitory storage medium having stored thereon further instructions that, when executed by the machine, result in reprogramming the switch by the component other than the NVMe-oF SSD to direct commands to the NVMe-oF SSD responsive to the NVMe-oF SSD is entering an active power mode.

Statement 76. An embodiment of the inventive concept includes the article according to statement 69, the non-transitory storage medium having stored thereon further instructions that, when executed by the machine, result in negotiating between the switch and the component other than the NVMe-oF SSD that the component other than the NVMe-oF SSD will respond to the KA message on behalf of the NVMe-oF SSD, wherein the component is drawn from a set including the processor and the BMC.

Statement 77. An embodiment of the inventive concept includes the article according to statement 76, wherein negotiating between the switch and the component other than the NVMe-oF SSD that the component other than the NVMe-oF SSD will respond to the KA message on behalf of the NVMe-oF SSD includes negotiating between the switch and the component other than the NVMe-oF SSD that the component other than the NVMe-oF SSD will respond to the KA message on behalf of the NVMe-oF SSD responsive to an activity level for the NVMe-oF SSD.

Statement 78. An embodiment of the inventive concept includes the article according to statement 69, the non-transitory storage medium having stored thereon further instructions that, when executed by the machine, result in:

receiving a second KA message sent from the remote processor to the NVMe-oF SSD in an active power mode at a component other than the NVMe-oF SSD; and sending a second response to the second KA message to the remote processor from the component on behalf of the NVMe-oF SSD.

Statement 79. An embodiment of the inventive concept includes the article according to statement 78, wherein the NVMe-oF SSD is not operative to respond to the second KA message.

Statement 80. An embodiment of the inventive concept includes the article according to statement 78, the non-transitory storage medium having stored thereon further instructions that, when executed by the machine, result in receiving from the NVMe-oF SSD at the component other than then NVMe-oF SSD a protocol state of the NVMe-oF SSD in the active power mode.

Statement 81. An embodiment of the inventive concept includes the article according to statement 68, wherein:

receiving the KA message sent from the remote processor to a Non-Volatile Memory Express (NVMe) over Fabrics (NVMe-oF) Solid State Drive (SSD) in the low power mode includes receiving the KA message sent from the remote processor to the NVMe-oF SSD in the low power mode at a KA Logic circuit of the NVMe-oF SSD that is active even when the at least one NVMe-oF SSD is in the low power mode; and sending the response to the KA message to the remote processor on behalf of the NVMe-oF SSD includes sending the response to the KA message to the remote processor from the KA Logic circuit while the NVMe-oF SSD is in the low power mode.

Statement 82. An embodiment of the inventive concept includes the article according to statement 81, wherein the KA Logic circuit is active even when the at least one NVMe-oF SSD is in the low power mode.

Statement 83. An embodiment of the inventive concept includes an article, comprising a non-transitory storage medium, the non-transitory storage medium having stored thereon instructions that, when executed by a machine, result in:

receiving a data request sent from a remote processor to a storage device at a component other than the storage device, the storage device in a low power mode; and based at least in part on a data in the data request is present in a cache local to the component other than the storage device, responding to the data request using the cache local to the component other than the storage device, wherein the component other than the storage device is drawn from a set including a processor, a switch, and a Baseboard Management Controller (BMC).

Statement 84. An embodiment of the inventive concept includes the article according to statement 83, wherein:

receiving a data request sent from a remote processor to a storage device at a component other than the storage device includes receiving the data request sent from the remote processor to a Non-Volatile Memory Express (NVMe) over Fabrics (NVMe-oF) Solid State Drive (SSD) at a component other than the NVMe-oF SSD; and based at least in part on a data in the data request is present in a cache local to the component other than the storage device, responding to the data request using a cache local to the component other than the storage device includes based at least in part on the data in the data request is present in the cache local to the component other than the storage device, responding to the data request using the cache local to the component other than the NVMe-oF SSD.

Statement 85. An embodiment of the inventive concept includes the article according to statement 84, the non-transitory storage medium having stored thereon further instructions that, when executed by the machine, result in based at least in part on the data in the data request is not present in the cache local to the component other than the storage device, forwarding the data request to the NVMe-oF SSD.

Statement 86. An embodiment of the inventive concept includes the article according to statement 84, wherein:

the data request includes a read request; and the non-transitory storage medium has stored thereon further instructions that, when executed by the machine, result in reading the data by the component other than the NVMe-oF SSD from the cache local to the component other than the NVMe-oF SSD without the NVMe-oF SSD entering an active power mode.

Statement 87. An embodiment of the inventive concept includes the article according to statement 84, wherein:

the data request includes a write request; and the non-transitory storage medium has stored thereon further instructions that, when executed by the machine, result in storing the data by the component other than the NVMe-oF SSD in the cache local to the component other than the NVMe-oF SSD without the NVMe-oF SSD entering an active power mode.

Statement 88. An embodiment of the inventive concept includes the article according to statement 87, the non-transitory storage medium having stored thereon further instructions that, when executed by the machine, result in sending the data from the component other than the NVMe-oF SSD to the NVMe-oF SSD when the NVMe-oF SSD is in an active power mode.

Statement 89. An embodiment of the inventive concept includes an article, comprising a non-transitory storage medium, the non-transitory storage medium having stored thereon instructions that, when executed by a machine, result in:

receiving a management command from a component other than a storage device at the storage device, the storage device in a low power mode; and processing the management command using a power domain of the storage device that is active in the low power mode.

Statement 90. An embodiment of the inventive concept includes the article according to statement 89, wherein receiving a management command from a component other than a storage device at the storage device, the storage device in a low power mode includes receiving the management command from the component other than a Non-Volatile Memory Express (NVMe) over Fabrics (NVMe-oF) Solid State Drive (SSD) at the NVMe-oF SSD; and processing the management command using a power domain of the storage device that is active in the low power mode includes processing the management command using the power domain of the NVMe-oF SSD that is active in the low power mode.

Statement 91. An embodiment of the inventive concept includes the article according to statement 90, wherein receiving the management command from the component other than a Non-Volatile Memory Express (NVMe) over Fabrics (NVMe-oF) Solid State Drive (SSD) at the NVMe-oF SSD includes receiving the management command from the component other than the NVMe-oF SSD at the NVMe-oF SSD using an out-of-band mechanism.

Statement 92. An embodiment of the inventive concept includes the article according to statement 91, wherein the out-of-band mechanism includes a System Management Bus (SMBus).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. An apparatus, comprising:
   a receiver to receive a Keep-Alive (KA) message from a remote processor via a switch, the KA message intended for a Non-Volatile Memory Express over Fabrics (NVMe-oF) Solid State Drive (SSD);
   a Keep-Alive logic to generate a KA response to the KA message;
   a transmitter to send a KA response to the remote processor on behalf of the NVMe-oF SSD; and
   a switch programming logic to instruct the switch to modify a routing table to route the KA message from the remote processor intended for the NVMe-oF SSD to the apparatus.

2. The apparatus according to claim 1, further comprising a device status table storing information about a status of the NVMe-oF SSD.

3. The apparatus according to claim 2, wherein the device status table is operative to store a protocol state of the NVMe-oF SSD.

4. The apparatus according to claim 3, wherein the Keep-Alive logic is operative to generate the KA response to the KA message responsive to the protocol state stored in the device status table.

5. An apparatus according to claim 1, wherein the apparatus is separate from the NVMe-oF SSD.

6. A method, comprising:
- receiving a Keep Alive (KA) message sent from a remote processor to a Non-Volatile Memory Express over Fabrics (NVMe-oF) Solid State Drive (SSD) in a low power mode, wherein receiving the KA message sent from the remote processor to the NVMe-oF SSD in the low power mode includes receiving the KA message sent from the remote processor to the NVMe-oF SSD in the low power mode at a component other than the NVMe-oF SSD; and
- sending a response to the KA message to the remote processor on behalf of the NVMe-oF SSD, wherein sending the response to the KA message to the remote processor on behalf of the NVMe-oF SSD includes sending the response to the KA message to the remote processor on behalf of the NVMe-oF SSD from the component on behalf of the NVMe-oF SSD,
- wherein the component is drawn from a set including a processor, a Baseboard Management Controller (BMC), and a switch.

7. The method according to claim 6, further comprising reprogramming the switch by the component other than the NVMe-oF SSD to direct the KA message to the component other than the NVMe-oF SSD.

8. The method according to claim 6, further comprising:
- receiving a second KA message sent from the remote processor to the NVMe-oF SSD in an active power mode at the component other than the NVMe-oF SSD; and
- sending a second response to the second KA message to the remote processor from the component on behalf of the NVMe-oF SSD.

* * * * *